(12) United States Patent
Shum et al.

(10) Patent No.: US 6,271,855 B1
(45) Date of Patent: Aug. 7, 2001

(54) INTERACTIVE CONSTRUCTION OF 3D MODELS FROM PANORAMIC IMAGES EMPLOYING HARD AND SOFT CONSTRAINT CHARACTERIZATION AND DECOMPOSING TECHNIQUES

(75) Inventors: Heung-Yeung Shum, Bellevue, WA (US); Mei Han, Pittsburgh, PA (US); Richard S. Szeliski, Bellevue, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/099,098

(22) Filed: Jun. 18, 1998

(51) Int. Cl.⁷ .................................................. G06T 15/10
(52) U.S. Cl. ............................................ 345/427; 382/154
(58) Field of Search ..................................... 345/419, 427, 345/433, 435, 113, 437–439; 382/106, 154

(56) References Cited

U.S. PATENT DOCUMENTS

| | | | |
|---|---|---|---|
| 5,579,105 | * 11/1996 | Belton et al. | ......................... 356/310 |
| 5,633,995 | * 5/1997 | McClaim | .............................. 395/119 |
| 5,745,126 | * 4/1998 | Jain et al. | .............................. 345/952 |
| 6,040,836 | * 3/2000 | Shiitani et al. | ....................... 345/427 |
| 6,046,745 | * 4/2000 | Moriya et al. | ....................... 345/420 |

OTHER PUBLICATIONS

[BB95] S. Becker and V. M. Bove. Semiautomatic 3–D model extraction from uncalibrated 2–D camera views. In SPIE vol. 2410, Visual Data Exploration II, pp. 447–461, Feb. 1995.

Zha97 Z. Zhang. Determining the epipolar geometry and its uncertainty: A review. IJCV'98, vol. 27, No. 2, pp. 161–195, Mar. 1998.

(List continued on next page.)

Primary Examiner—Mark Zimmerman
Assistant Examiner—Mano Padmanabhan
(74) Attorney, Agent, or Firm—Lyon, Harr & Defrank; Richard T. Lyon

(57) ABSTRACT

An interactive system and process for constructing a model of a 3D scene from a panoramic view of the scene. In the constructed model, the 3D scene is represented by sets of connected planes. The modeling begins by providing the user with a display of an image of the panoramic view. The user is then required to specify information concerning certain geometric features of the scene. A computer program recovers a camera orientation matrix of the panoramic view based on the features specified by the user. Plane normals and line directions for planes in the 3D scene are estimated using this matrix as well as the user-specified information. A camera translation is also recovered, as are plane distances and vertex point locations for planes in the 3D scene, using the user-supplied information, camera orientation matrix, and the estimated plane normals and line directions. The model of the 3D scene is then constructed based on the plane normal and plane distance, and/or the vertex point locations, of each plane in the set. Preferably, the plane distances and vertex point locations, and optionally the camera translation, are recovered by creating a system of equations based on the geometric constraints of the 3D scene. The constraint equation are characterized as hard is they include a user-designated parameter, otherwise they are considered soft constraints. The systems of equations is solved in a manner which gives priority to hard constraint equations. A decomposing process can also be employed prior to solving the systems of equation to ensure their solvability.

82 Claims, 21 Drawing Sheets

(2 of 21 Drawing Sheet(s) Filed in Color)

OTHER PUBLICATIONS

[CW90] R. T. Collins and R. S. Weiss. Vanish point calculation as a statistical inference on the unit sphere. In ICCV'90, pp. 400–403, Dec. 1990.

[FSL#95] O.D. Faugeras, Laveau S., Robert L., Csurka G., and Zeller C. 3–D reconstruction of urban scenes from sequences of images. Technical Report 2572, INRIA, 1995.

[WH88] E. L. Walker and M. Herman. Geometric reasoning for constructing 3D scene descriptions from images. Artificial Intelligence, 37:275–290, 1988.

[Har89] R. M. Haralick. Determining camera parameters from the perspective projection of a rectangle. Pattern Recognition, 22(3):225–230, 1989.

[KS96] S. B. Kang and R. Szeliski. 3–D scene data recovery using omnidirectional multibaseline stereo. In CVRP'96, pp. 364–370, Jun. 1996.

[KW97] S. B. Kang and R Weiss. Characterization of errors in compositioning panoramic images. In CVPR'97, pp. 103–109, Jun. 1997.

[MB95] L. McMillan and G. Bishop. Plenoptic modeling: An image–based rendering system. SIGGRAPH'95, pp. 39–46, Aug. 1995.

[SK97] H. S. Sawhney and R. Kumar. True multi–image align–ment and its application to mosaicing and lens distortion correc–tion. In CVPR'97, pp. 450–456, Jun. 1997.

[SS97a] H.–Y. Shum and R. Szeliski. Construction and refinement of panoramic mo–saics with global and local alignment. In ICCV'98, pp. 953–958, 1998.

[SS97b] R. Szeliski and H. Y. Shum. Creating full view panoramic image mosaics and texture–mapped models. SIG–GRAPH'95, pp. 251–258, Aug. 1997.

[Ste95] G. Stein. Accurate internal camera calibration using rotation, with analysis of sources of error. In ICCV95, pp. 230–236, Jun. 1995.

[TDM96] C. J. Taylor, P. E. Debevec, and J. Malik. Reconstruct–ing polyhedral models of architectural scenes from photographs. In ECCV'96, vol. 2, pp. 659–668, Apr. 1996.

* cited by examiner

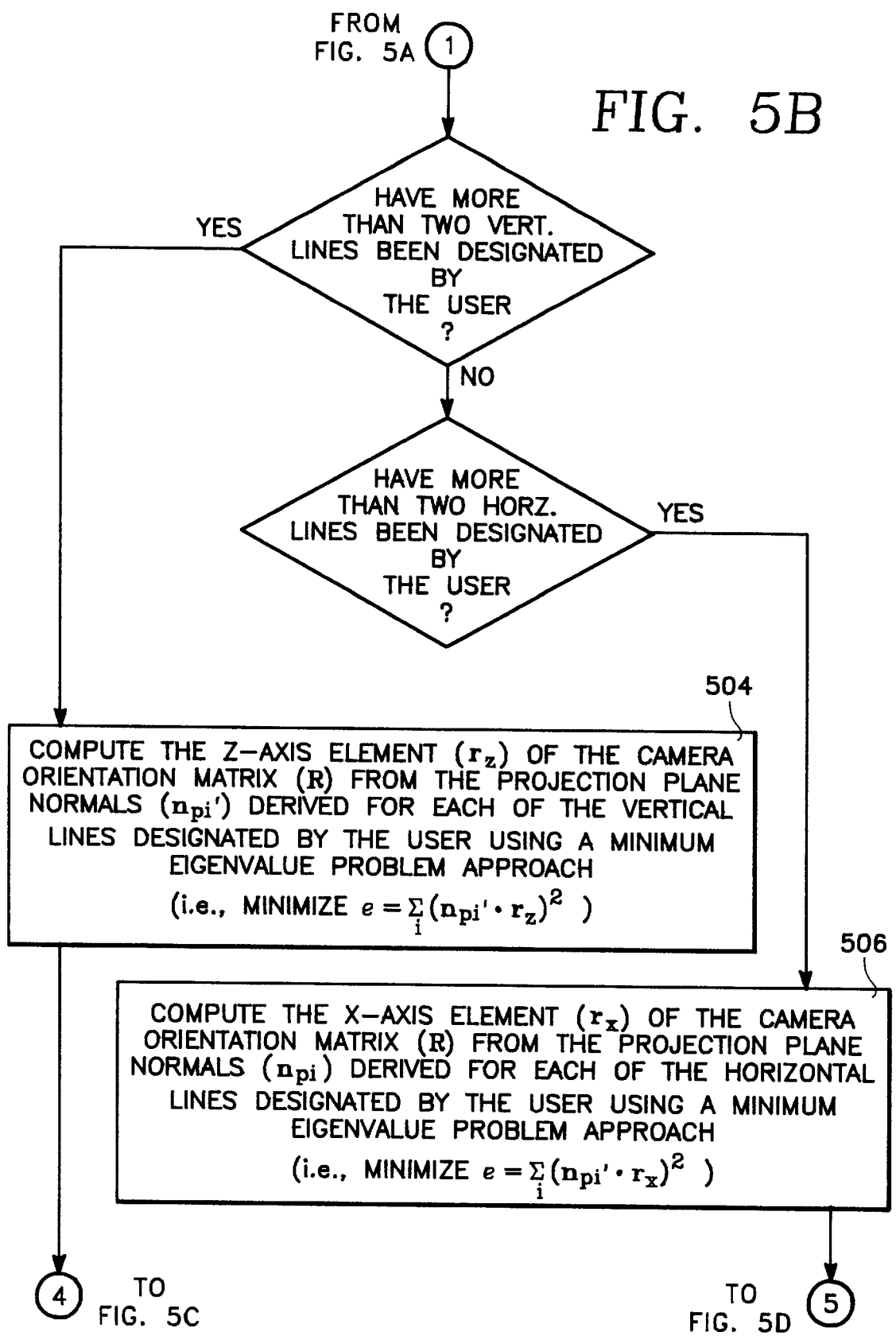

INTERACTIVE CONSTRUCTION OF 3D MODELS FROM PANORAMIC IMAGES EMPLOYING HARD AND SOFT CONSTRAINT CHARACTERIZATION AND DECOMPOSING TECHNIQUES

BACKGROUND

1. Technical Field

The invention is related to a computer-implemented system and process for constructing a model of a 3D scene from a panoramic view of the scene, and more particularly, to a system and process for improving the accuracy of the model.

2. Background Art

A great deal of effort has been expended on 3D scene reconstruction from image sequences (with calibrated or un-calibrated cameras, e.g., [FSL+95]) using computer vision techniques. Unfortunately, the results from most automatic modeling systems are disappointing and unreliable due to the complexity of the real scene and the fragility of the vision techniques. Part of the reason is the demand for accurate correspondences (e.g., point correspondence) required by many computer vision techniques such as stereo and structure from motion. Moreover, such correspondences may not be available if the scene consists of large un-textured regions.

Fortunately, for many real scenes, it is relatively straight forward to interactively specify corresponding points, or lines, or planes. For example, the interiors and exteriors of buildings provide vertical and horizontal lines, as well as parallel and perpendicular planes. These constraints have been exploited in several interactive modeling systems. For example, PhotoModeler (by Eos Systems Inc. of Vancouver, BC, Canada) is a commercial product which constructs 3D models from several images, using photogrammetry techniques and manually specified points. However, explicit camera calibration is necessary with this system. The Total-Calib system, on the other hand, estimates the fundamental matrix from a few selected matched points [BR97]. It then predicts other possible matching points from one image to others. In Becker's modeling system, the problem of lens distortion (encountered in images taken with wide field of view lenses) is also considered [BB95]. By employing the known structure of building exteriors, the Facade system directly recovers a solid 3D model (blocks) from multiple images [TDM96]. However, none of these systems employs panoramic images as does the present invention.

It is noted that in the preceding paragraphs, as well as in the remainder of this specification, the description refers to various individual publications identified by an alphanumeric designator contained within a pair of brackets. For example, such a reference may be identified by reciting, "reference [BR97]" or simply "[BR97]". Multiple references will be identified by a pair of brackets containing more than one designator, for example, [BR97, BB95, TDM96]. A listing of the publications corresponding to each designator can be found at the end of the Detailed Description section.

SUMMARY

The present invention relates to an interactive modeling system and process that constructs models of a 3D scene from a panoramic view of the scene. A user interface is employed to facilitate an exchange of information about the 3D scene between a user, and a computer-implemented modeler that constructs 3D models based on the user-supplied information.

The panoramic view or panorama employed in the present system and process is essentially a mosaic consisting of a set of images taken around the same viewpoint, which have been registered together to form one large image. As mentioned previously, this differs from previous modeling systems in that it uses panoramic image mosaics (therefore large fields of view), instead of multiple images (generally small fields of view). Such a modeling approach has much less ambiguity than traditional structure from motion approaches because it uses these wide field of view images, and therefore obtains a better estimate of camera rotation. Panoramas also offer several other advantages over regular images. First, the modeling problem can be decoupled into a zero baseline problem (building a panorama from images taken with rotating camera) and a wide baseline stereo or structure from motion problem (recovering a 3D model from the panorama). Second, the camera calibration problem is implicitly recovered as part of the panorama construction [Ste95, KW97, SK97]. Further, due to recent advances, it is now possible to construct panoramas with hand-held cameras [SS97b], thereby making panoramic images readily obtainable. It should be noted that the system and process of the present invention could also handle calibrated (non-panoramic) images as well. These images would simply be treated as narrow field of view panoramas. However, the recovered 3D model will not be as accurate with narrow field of view images, and so the use of these types of images is not preferred.

One of the keys to the present invention is its reliance on user-supplied information about the 3D scene being modeled. Previous work on 3D reconstruction from panoramas [MB95, KS96] has not attempted to exploit important regularities present in the environment, such as walls with known orientations. However, the structures associated with the manmade environment are full of regularities such as parallel lines, lines with known directions, planes with lines and points on them, etc., which can be taken advantage of in the modeling process [WH88]. Using these constraints, a fairly complex 3D model can be constructed from even a single panorama.

The modeling begins by providing the user with a display of an image of the panoramic view of the 3D scene on a computer monitor screen. The user is then required to specify information concerning certain geometric features of the scene on the screen image. A computer program executable by a computing device recovers a camera orientation matrix of the panoramic view based on the features specified by the user. Plane normals and line directions associated with each plane in the 3D scene which is to be modeled are estimated using this matrix, and the user-specified information. In addition, a camera translation can be optionally recovered at this stage of the process. These initial stages of the interactive modeling process can be accomplished via any appropriate method. However, the methods disclosed in a co-pending application entitled INTERACTIVE CONSTRUCTION OF 3D MODELS FROM PANORAMIC IMAGES by the inventors of this application and assigned to the common assignee, are preferred. This co-pending application was filed on Jun. 18, 1998 and assigned Ser. No. 09/099,161, now U.S. Pat. No. 6,084,592.

The process described in the above-referenced co-pending patent application involves first displaying an image of the panoramic view of the 3D scene on a computer monitor screen. The camera orientation matrix of the panoramic view is then recovered based on user-specified lines associated with at least one plane of the 3D scene. The user specifies lines by designating the location of two points of the line (preferably the end points) on the screen image and inputting the direction of the corresponding line in 3D scene (e.g., vertical or horizontal). A line is then displayed on the screen image between the two designated points. The camera orientation matrix can be computed if the user specifies at least two vertical lines and one horizontal line of the 3D scene on the plane or at least two horizontal lines and one vertical line of the 3D scene. The camera orientation matrix can also be derived if the user specifies at least two sets of parallel lines of the 3D scene.

The next step of the process is to estimate plane normals and line directions for each plane in the 3D scene. This is generally accomplished by the user "drawing" either two pairs of parallel lines (e.g., a parallelogram) or three lines of a rectangle on each plane in the screen image that is to be modeled. The user "draws" these lines, as before, by designating the location of two points of a line for every line "drawn" on the screen image. Once the required lines have been drawn on a plane in the screen image, the direction of the corresponding line in the 3D scene is derived using the camera orientation matrix. Finally, a normal for each plane being modeled in the 3D scene is computed from the previously derived line directions associated with that plane.

A camera translation, which is defined as the difference between a so-called camera projection center and the coordinate origin of the 3D scene, can be derived next if desired. The camera projection center corresponds to the coordinate origin of the panoramic view projected into the 3D scene. The camera translation is derived by the user identifying the location of at least two points in the screen image and specifying their 3D scene coordinates. A way of characterizing the conversion of a point in the 3D scene to a corresponding point in the panoramic view is to employ the relationship, $(x-t) \cdot (R^T j') = 0$, $j=0,1,2$ where x represents the coordinates of a point in the 3D scene, t represents the camera translation, R represents the camera orientation matrix, x' represents the coordinates of a point in the panoramic view which corresponds to the point x in the 3D scene and $p_0' = (-x_2, x_1, 0)$, $p_1' = (-x_3, 0, x_1)$ and $P_2' = (0, -x_3, x_2)$ represent three directions perpendicular to a ray from the camera center through the point $x' = (x_1, x_2, x_3)$. Thus using the two or more user specified points, a system of linear equations can be created and solved for the camera translation using a least-squares approach.

In the preferred 3D scene modeling system and process embodying the present invention, the 3D scene is represented by sets of connected planes. If all the structures of the 3D scene are connected, then only one set of planes is needed. If however, the scene is made up of two or more unconnected structures, the 3D scene is represented by a corresponding number of connected plane sets. Each plane used to model the 3D scene is defined by its plane normal and plane distance, and/or by its vertex point locations. Thus, these parameters are obtained to complete the modeling procedure.

In the previously identified co-pending patent application, the scene parameters are found, along with the camera translation if it has not already been recovered, by creating a system of linear geometric constraint equations. The system of equations employs all available geometric constraints and includes various scene parameters such as user-designated 3D scene points, plane normals, line directions, plane distances and parallel plane designations, as well as the previously estimated plane normals and line directions. The system of equations is then solved for all the unknown plane distances and vertex point locations (and possibly the camera translation) using a least-squares approach. A system of equations is created for each unconnected structure in the 3D scene and individually solved for all unknown parameters. Once all the planes that are to be modeled in each unconnected structure within the 3D scene are defined, the model is constructed and displayed as desired.

While the foregoing modeling system and process will produce a model of a 3D scene with sufficient accuracy to satisfy many applications, it is possible to refine the model. The refinement process is accomplished in accordance with systems and processes embodying the present invention. A preferred way of accomplishing this refinement is to characterize each equation in the above-described systems of linear constraint equations as being either a hard or soft constraint. A constraint equation is designated a hard constraint whenever it includes a user-designated parameter (i.e., x", d", n", m", parallel planes), and a soft constraint whenever it lacks such a parameter. For example, equations based on previously-estimated plane normals and line directions would be best designated as soft constraints due to the possible inaccuracies introduced by estimating these parameters from a potentially noisy panoramic view. In one preferred embodiment, the characterized system of constraint equations is solved using an equality-constrained least squares approach where the equations designated as soft constraints are solved subject to the equations designated as hard constraints. In an alternate preferred embodiment, a unity weight factor is assigned to all soft constraints and a large weight factor to all hard constraints. The weighted system of constraint equations is then solved via a conventional least-squares approach.

In connection with any of the foregoing ways of solving the systems of linear constrain equations, it is preferred that the solving step be preceded by a decomposition step. This decomposing of the system of constraint equations is designed to ensure its solvability. The decomposing step includes imposing one or more requirements that are indicative of the solvability of the system. For example, in all the foregoing embodiments, it is preferred that each system of equations be checked to ensure the number of equations is no fewer than the number of unknowns. In addition, it is preferred that each system of equations be checked to ensure the right side of each equation is a non-zero vector. In those embodiments where the constraint equations are characterized as being either hard or soft constraints, an additional requirement is preferably imposed—namely that all the hard constraints are consistent with one another. If the foregoing solvability requirements are not met, it is preferred that the system of equations involved be declared unsolvable. The user would then be provided with an indication of which unknown plane distances and/or vertex point locations cannot be estimated via an appropriate screen image. In addition, the user could be provided with an indication of what user designatable information could be entered to allow the system to be solved In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

FIGS. 5A through 5D are block diagrams of a process for accomplishing the sub-module for determining the camera orientation matrix using at least two user-specified vertical lines and one horizontal line (or two horizontal and one vertical) associated with the process of FIGS. 4A & 4B.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
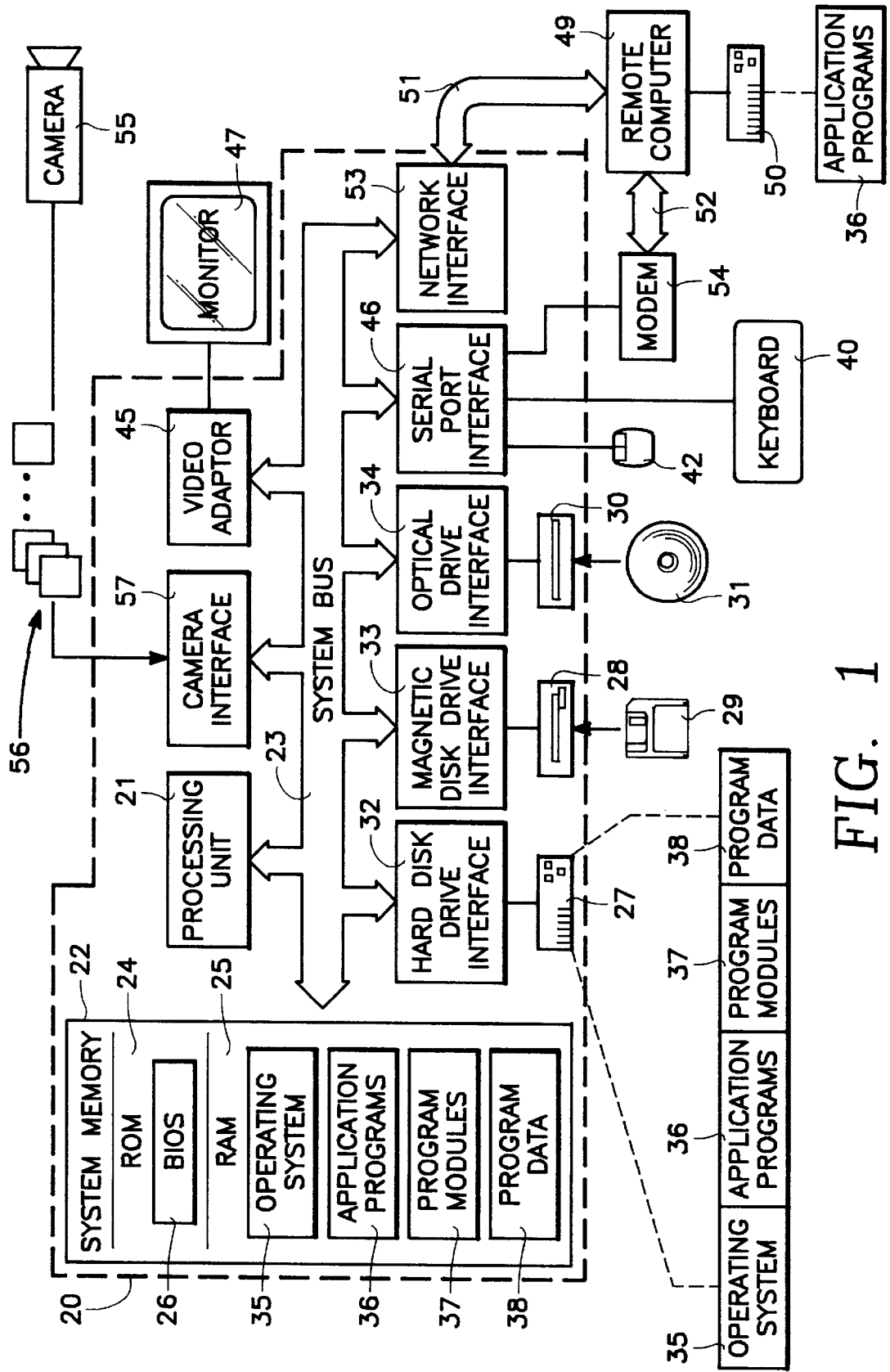
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film /photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
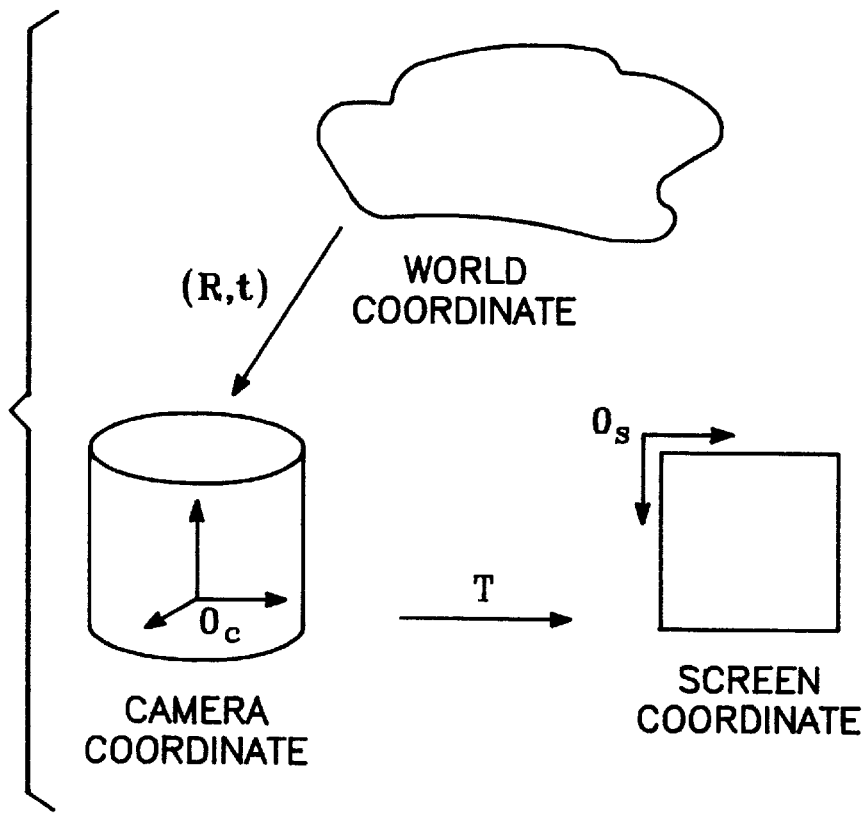
FIG. 2 is a diagram graphically depicting the various coordinate systems employed with the present invention.

The exemplary operating environment having now been discussed, the remaining part of this description section will be devoted to a description of the program modules embodying the invention and the testing of these modules. Three separate coordinate systems are referred to throughout the following description. As illustrated in FIG. 2, the first coordinate system is the world coordinate system where the 3D model geometry (planes, lines, vertices) is defined. Coordinates in this first system will be referred to as 3D scene coordinates. The second coordinate system is the "2D" camera coordinate system associated with a panoramic view of the 3D scene to be modeled, hereinafter referred to as panorama or panoramic view coordinates. The panorama coordinates are referred to as being 2D because each point on the panorama has only two degrees of freedom because its distance from the camera is not known. The third coordinate system is the screen coordinate system associated with a screen image (such as one appearing on the computer monitor 47 of FIG. 1) of the panoramic view employed as a user interface. It is noted that the screen image can be zoomed and rotated via conventional methods to facilitate user interaction.

The 3D model is represented by a set of connected planes and their associated points and lines. Each point is represented by its 3D coordinate x. Each line is represented by its line direction m and points on the line. Each plane is characterized by its normal n and its plane distance d, and/or its vertex point locations. The plane distance is defined as the distance from the 3D coordinate origin to a plane along a line normal to the plane, assuming the plane is infinite. Also note that n·x+d=0 or (n, d)·(x, 1)=0.

A panorama consists of a collection of images and their associated transformations and constitutes a panoramic view of the 3D scene being modeled. A 2D point x' (i.e., on a panorama) represents a ray going through the 2D model origin (i.e., camera optical center $O_c$). Likewise, a 2D line (represented by its line direction m') lies on the "line projection plane" (with normal $n_p$') which passes through the line and 2D model origin (FIG. 2). Therefore, a line direction in a 2D model cannot be uniquely determined by just two points.

Figure 3:
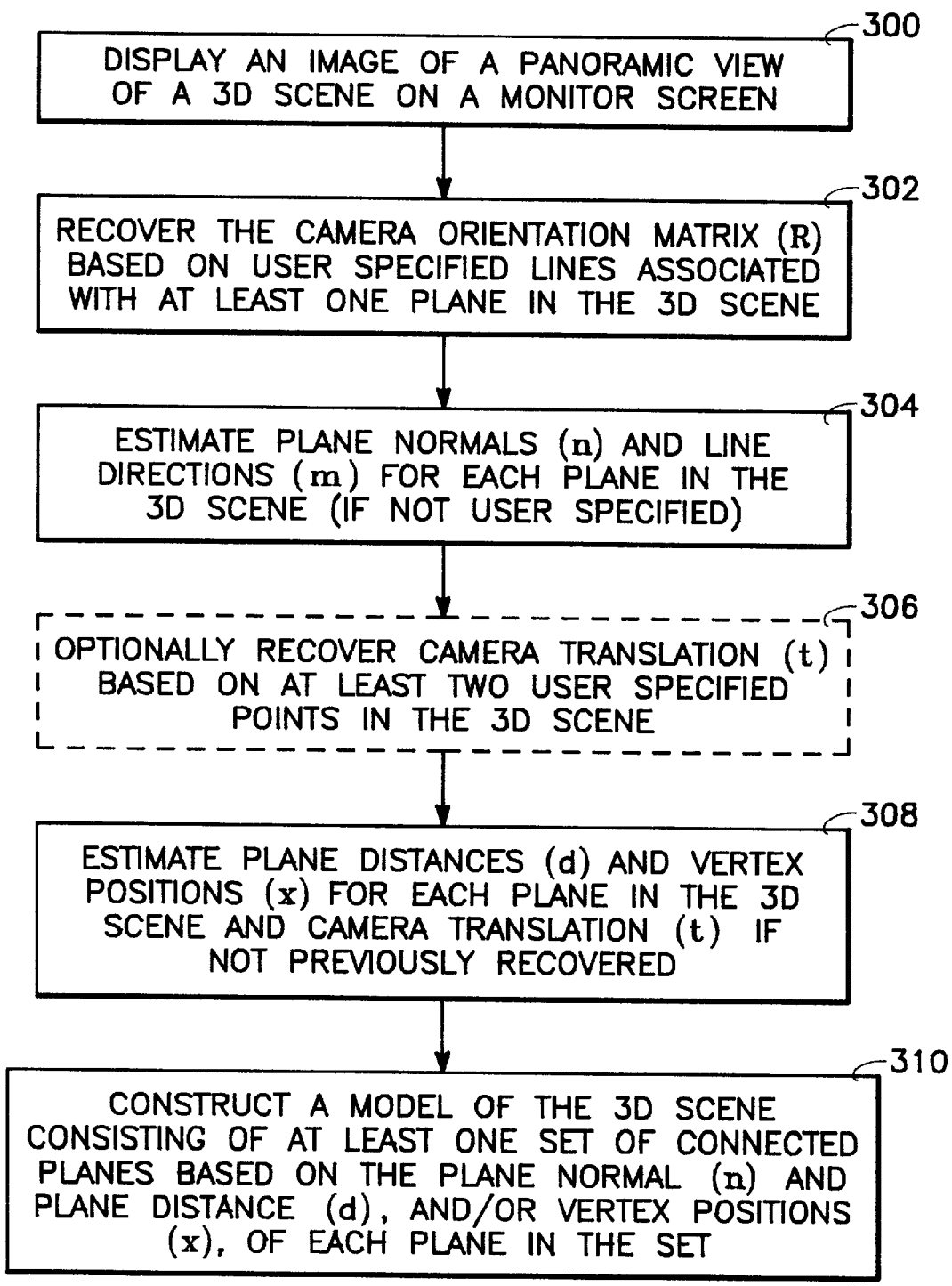
FIG. 3 is a block diagram of an overall process for constructing a model of a 3D scene from a panoramic view of the scene according to the present invention.

Many geometric constraints exist in real scenes. For example, there may be known features like points, lines, and planes. Or there may be known relationships such as parallel and vertical lines and planes, points on a line or a plane. Some of these constraints are bilinear. For example, a point on a plane is a bilinear constraint in both the point location and the plane normal. However, plane normals and line directions can be recovered without knowing plane distance and points. Thus, it is possible to decouple the modeling process into several linear steps. As illustrated in FIG. 3, the high-level structure of the modeling process involves the steps of:

displaying the image of the panoramic view of a 3D scene on the screen of a computer monitor (step 300);

recovering a camera orientation matrix (R) associated with the panoramic view from user-designated lines and line directions (step 302);

estimating plane normals (n) and line directions (m) using the camera orientation matrix (step 304);

optionally recovering camera translation (t) from user-specified points (step 306);

estimating plane distances (d) and vertex point locations (x), as well as the camera translation if not previously recovered, using the estimated plane normals and line directions (step 308);

constructing a model of the 3D scene based on the estimated plane distances and vertex point locations (step 310).

These steps are explained in detail in the next sections.

1. Recovering The Camera Orientation Matrix (R)

This section discusses how to recover the camera orientation matrix (R) from user-designated lines and line directions. The camera orientation matrix describes the relationship between the 2D model (panorama coordinate system s and the 3D model (world coordinate system).

Figure 4C:
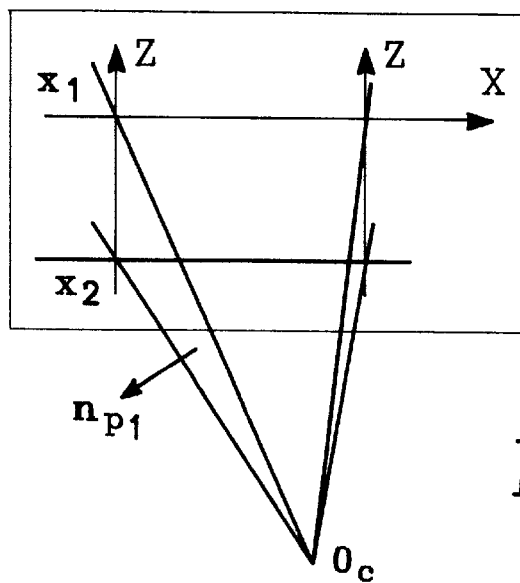
FIG. 4C is a diagram graphically depicting projection planes formed by user-specified lines on a plane in the panoramic view and the camera center of the panoramic view.
Figure 4A:
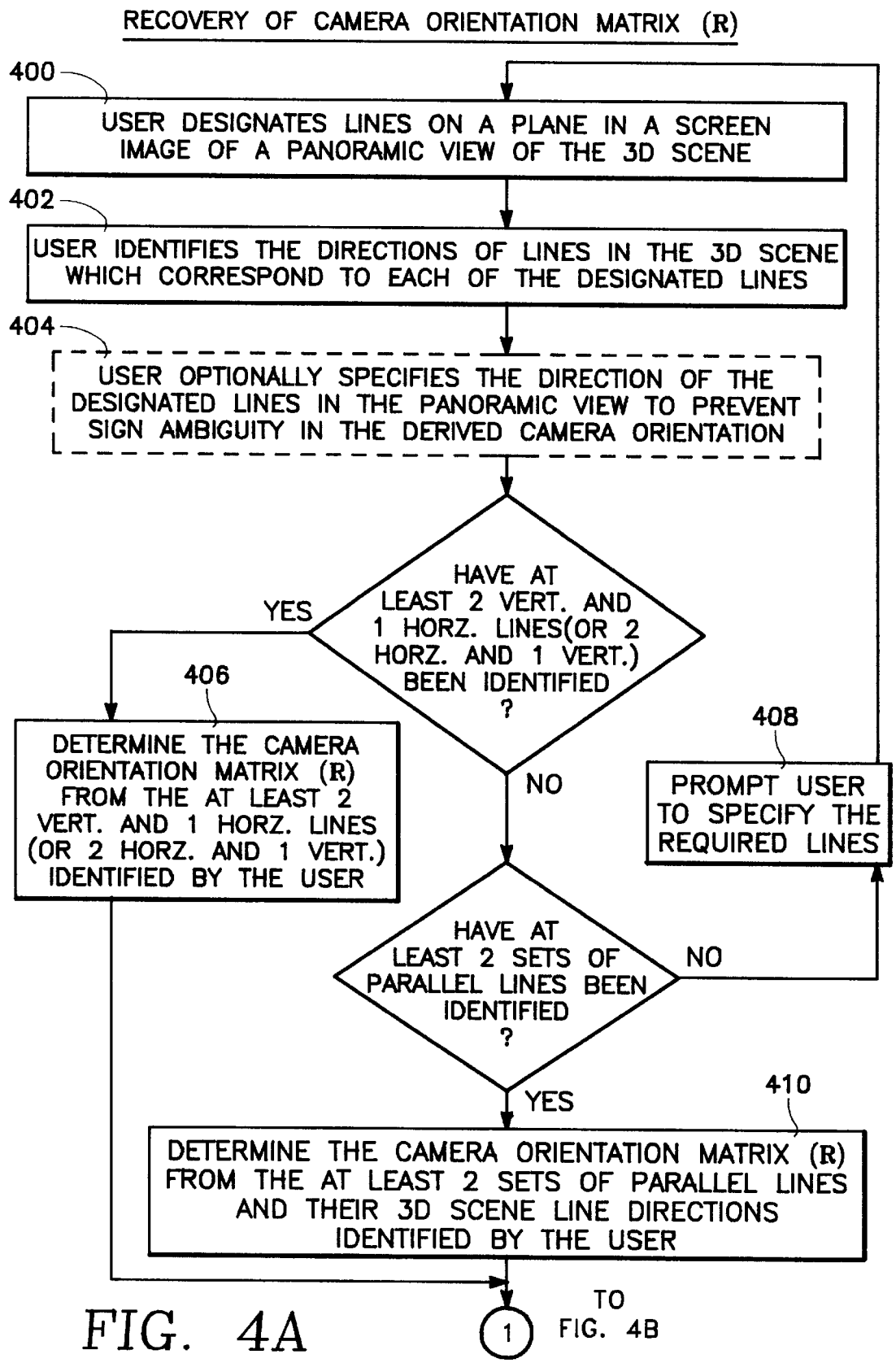
FIGS. 4A & 4B are block diagrams of a process for accomplishing the camera orientation matrix recovery program module of the overall process of FIG. 3.
Figure 4B:
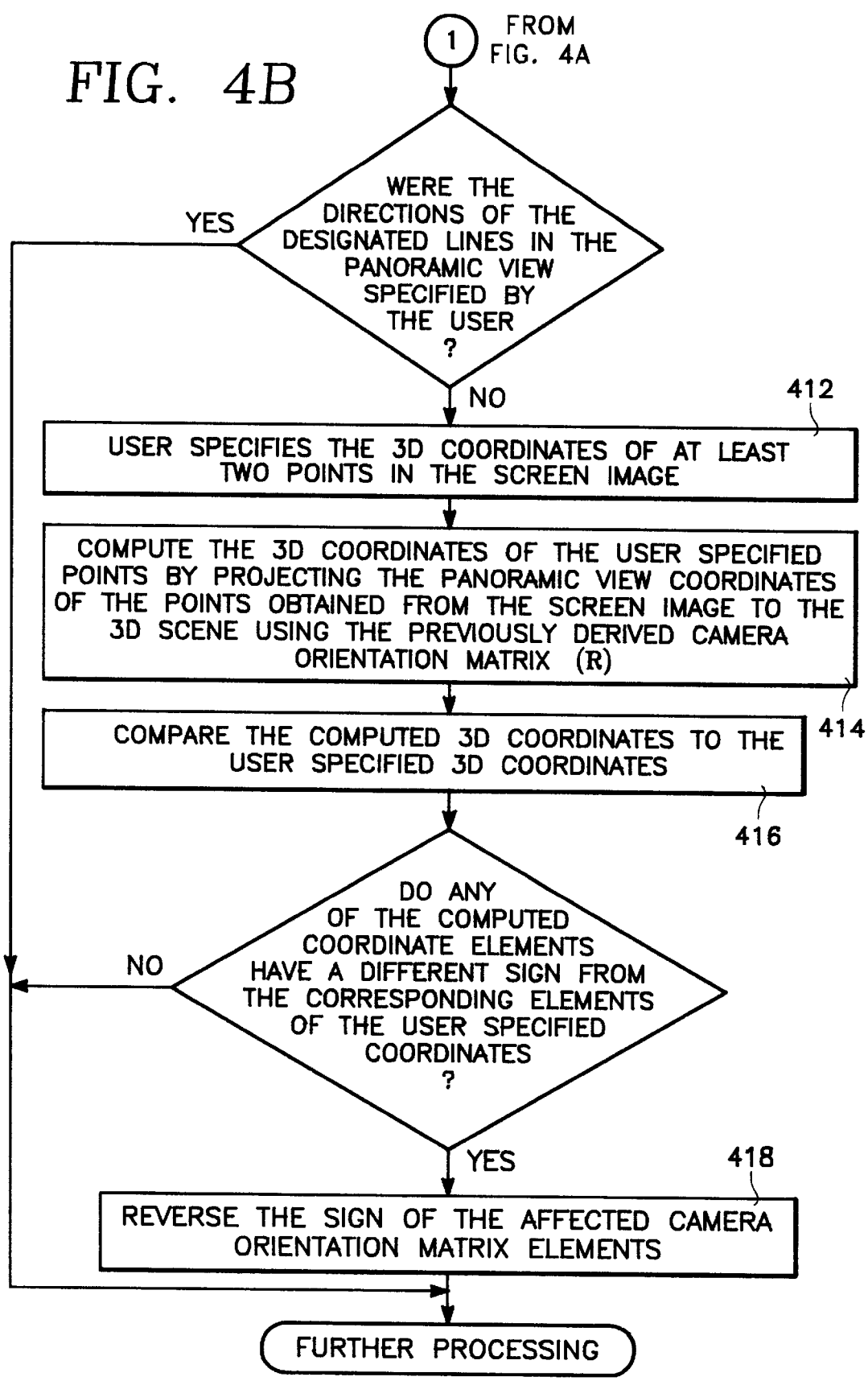

Referring to FIGS. 4A and 4B, the camera orientation matrix is generally recovered using lines designated by the user on at least one plane in the screen image (step 400) and the direction of these lines in the 3D scene (step 402). In a preferred embodiment of the present invention, a user designates a line on the screen image by specifying two points of the line, preferably the end points. A line appears between the specified points in the screen image for the benefit of the user. As stated previously, the user is also required to identify the direction the designated lines would have in the 3D scene being modeled. This is readily accomplished given the abundance of known vertical and horizontal lines associated with man-made structures in a real world 3D scene. For example, one can easily draw several vertical lines at the intersections of walls and mark them to be parallel to the Z axis of the world coordinate system.

1.1 Determining The Camera Orientation Matrix (R) From Two Vertical Lines & One Horizontal Line (Or Two Horizontal & One Vertical)

Figure 5A:
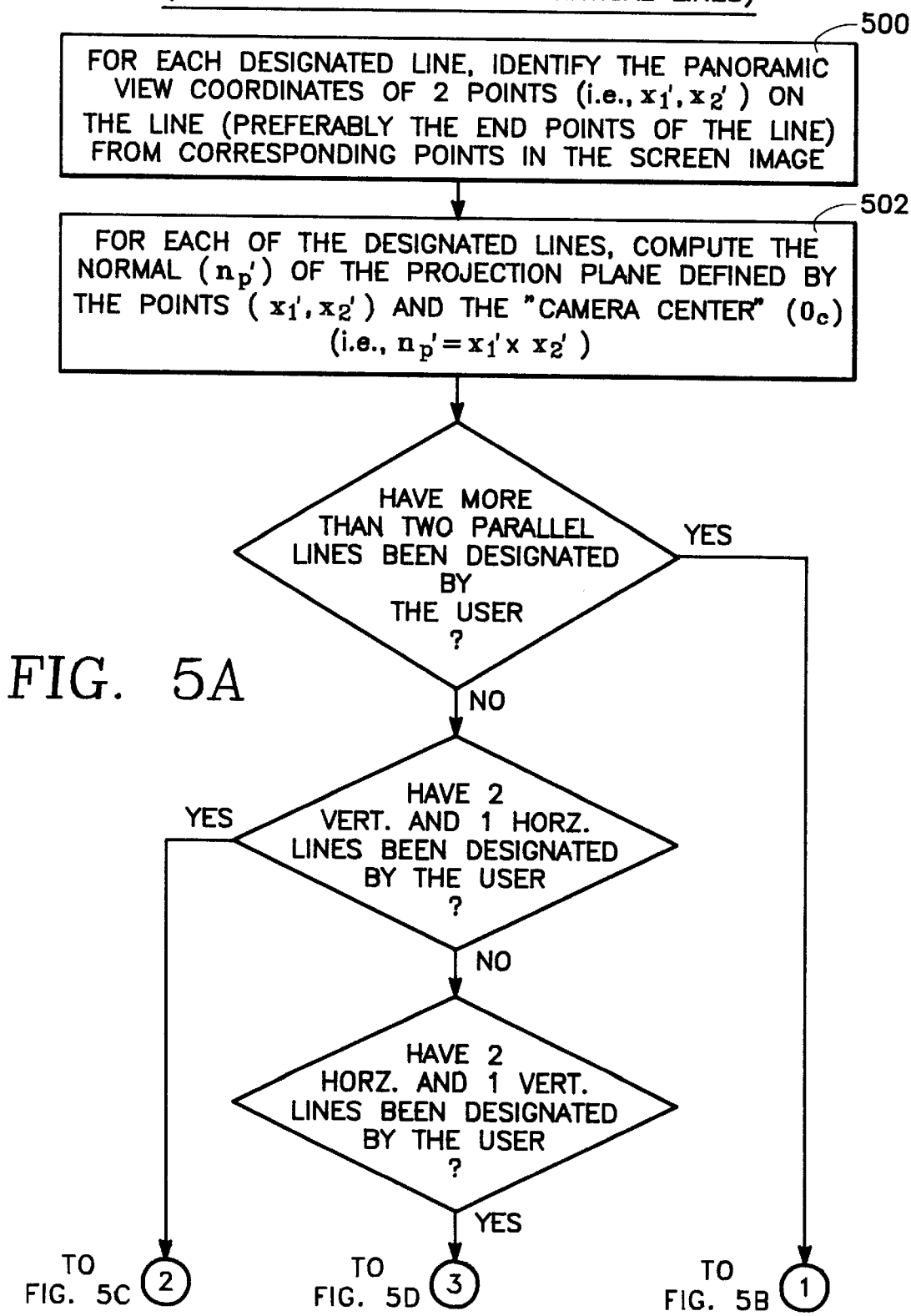

Referring to FIG. 4A, given that at least two 3D scene vertical lines and a 3D scene horizontal line are designated on a plane of the screen image by the user, the camera rotation matrix can be recovered (step 406). Each line forms a projection plane (with normal $n_p'$) through the camera origin, as depicted in FIG. 4C. Referring to FIG. 5A, the panorama coordinates of two points ($x_1'$, $x_2'$) on each line designated by the user in the screen image are first identified from the corresponding points in the screen image (step 500). Preferably, these two points are the end points of the line. It is noted that the conversion between screen image coordinates and panorama coordinates is straight forward process. If a point (e.g., a pixel) has a screen image coordinate of (u, v, 1), its corresponding 2D point in the panoramic view is represented by (u, v,f), where f is the camera focal length.

Given the two points $x_1'$ and $x_2'$ on each line, the projection plane normals ($n_p'$) can be computed by the cross product $n_p'=x_1' \times x_2'$ (step 502). The length of $n_p'$ is a good confidence (or certainty) measure of the normal $n_p'$.

Figure 5C:
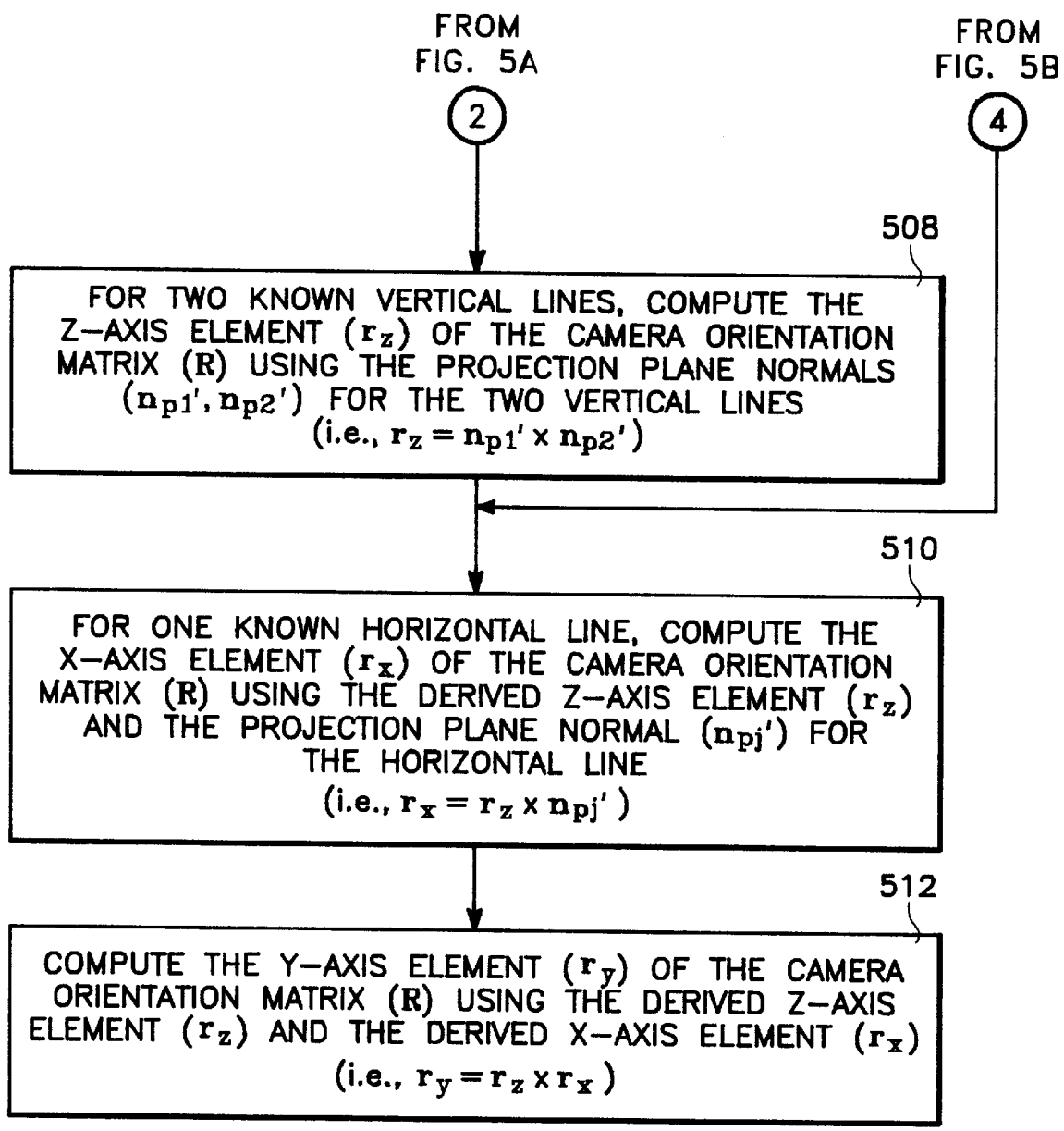

Let the camera orientation matrix (R)=$[r_x, r_y, r_z]$. Each vertical line parallel to the Z axis (and the plane formed with the origin) gives a constraint $n_p' \cdot r_z=0$. From two known vertical lines, $n_{p1}' \cdot r_z=0$, and $n_{p2}' \cdot r_z=0$, thus $r_z=n_{p1}' \times n_{p2}'$. Accordingly, the Z-axis element ($r_z$) of the camera orientation matrix can be computed using the projection plane normals for the two user-designated vertical lines (step 508), as shown in FIG. 5C. Note that there is a sign ambiguity for the recovered $r_z$.

With a known horizontal line of the 3D scene (e.g., parallel to the X axis), there is a constraint on $r_x$, i.e., $n_{pj}' \cdot r_x=0$. Thus, the X-axis element ($r_x$) of the camera orientation matrix can be computed using the previously derived Z-axis element ($r_z$) and the projection plane normal associated with the user-designated horizontal line (step 510), i.e. $r_x=r_z \times n_{pj}'$ because $r_z \cdot r_x=0$. Again there is a sign ambiguity for the recovered $r_x$. Finally, the Y-axis element ($r_y$) can be computed from the previously derived Z-axis ($r_z$) and X-axis ($r_x$) elements, i.e. $r_y=r_z \times r_x$ to complete the camera orientation matrix (step 512).

Figure 5D:
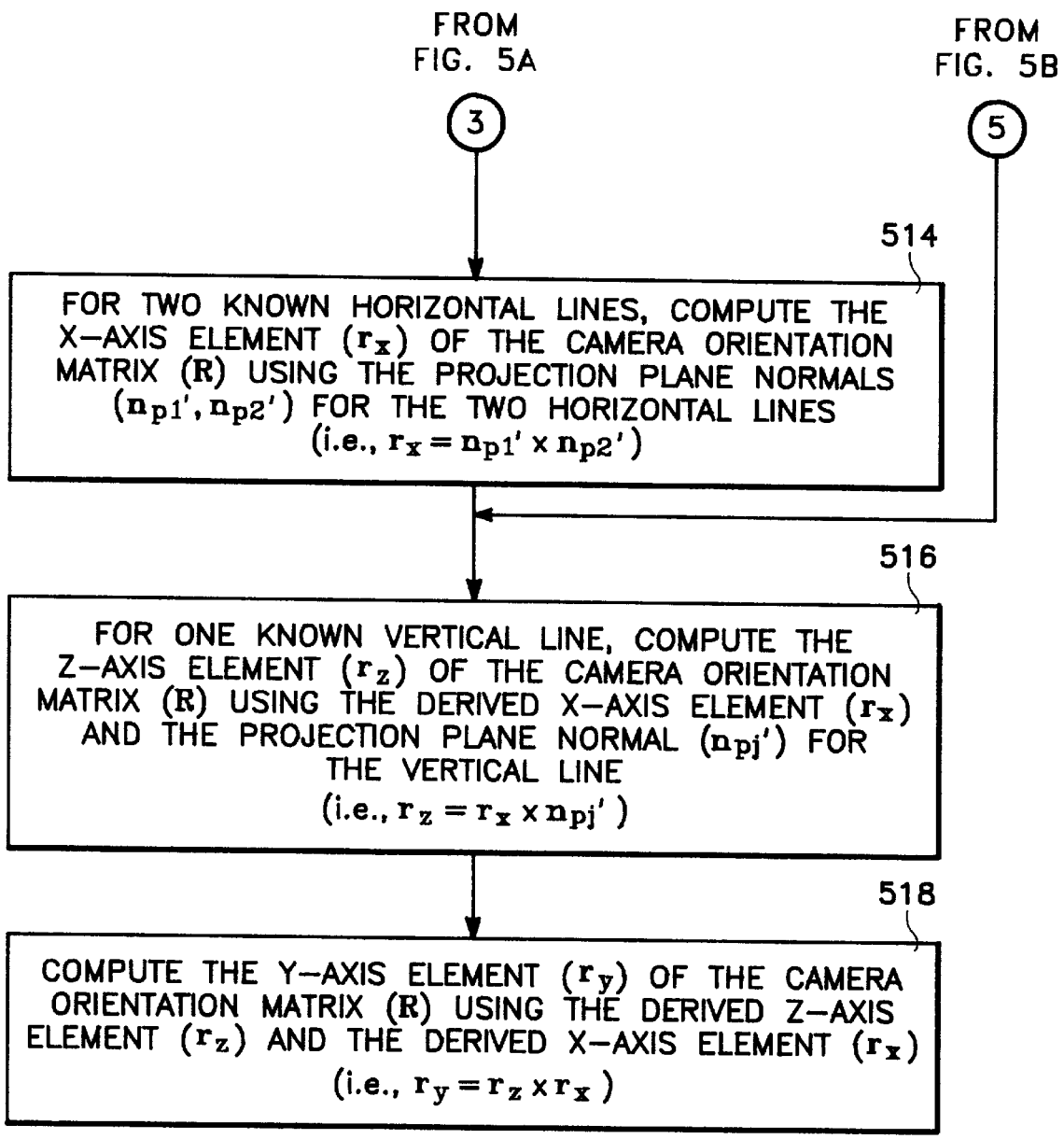

The camera orientation matrix can also be computed if two horizontal lines (e.g., parallel to the X axis) and a vertical line are known. As shown in FIG. 5D, the X-axis element ($r_x$) of the camera orientation matrix can be computed using the projection plane normals for two user-designated horizontal lines (step 514). Note again that there is a sign ambiguity for the recovered $r_x$. The Z-axis element ($r_z$) of the camera orientation matrix can then be computed using the previously derived X-axis element ($r_x$) and the projection plane normal associated with the user-designated vertical line (step 516), i.e. $r_z=r_x \times n_{pj}'$.

Again there is a sign ambiguity for the recovered $r_z$. Finally, the Y-axis element ($r_y$) can be computed from the previously derived X-axis ($r_x$) and Z-axis ($r_z$) elements, i.e. $r_y=r_x \times r_z$ to complete the camera orientation matrix (step 518).

Figure 6:
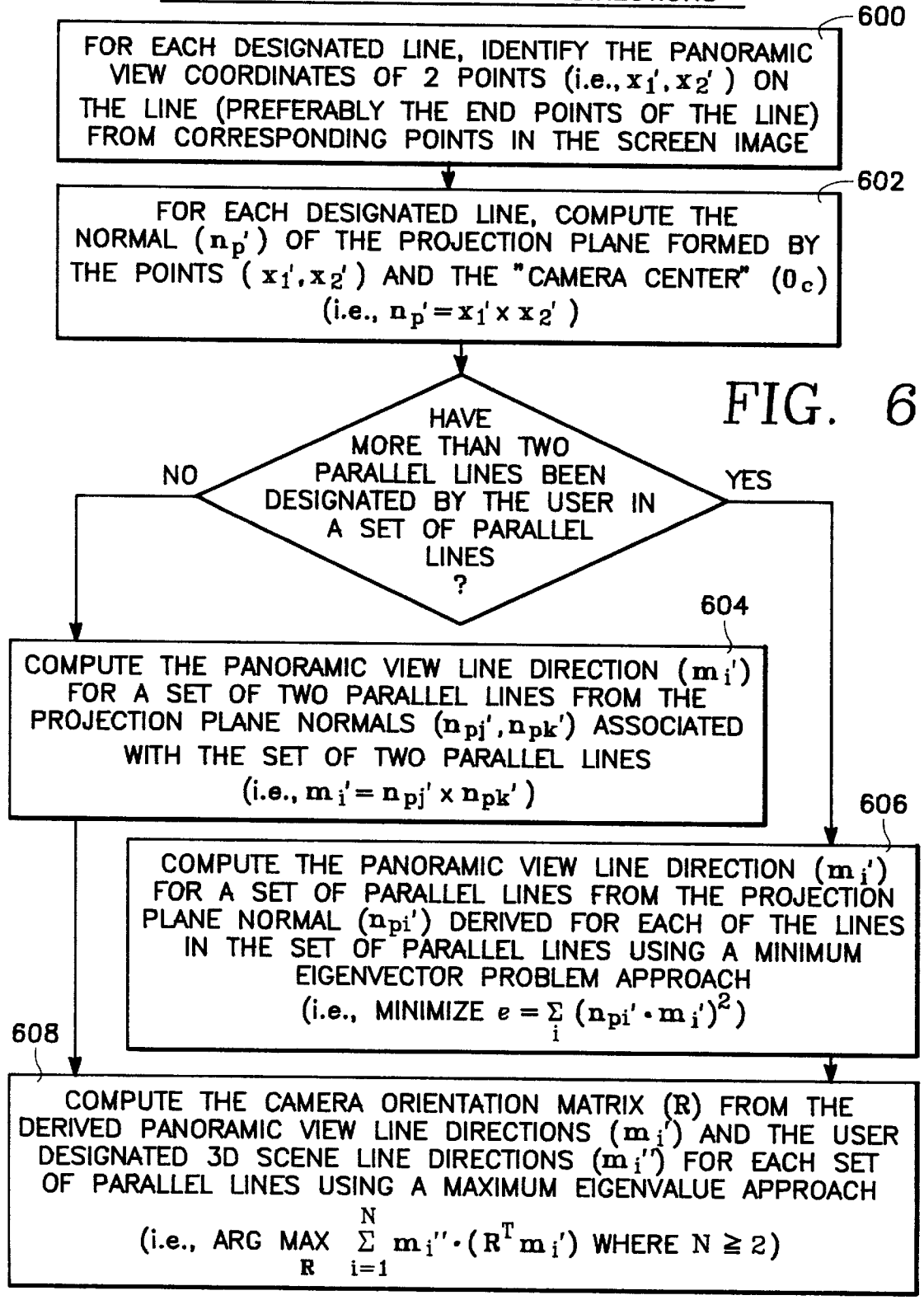
FIG. 6 is a block diagram of a process for accomplishing the sub-module for determining the camera orientation matrix using at least two sets of user-specified parallel lines and their user-specified 3D scene line directions associated with the process of FIGS. 4A & 4B.

1.2 Determining The Camera Orientation Matrix (R) From Two Sets Of Parallel Lines & Their Associated 3D Scene Line Directions Referring to FIG. 4A once again, given the user designates in the screen image at least two sets of parallel lines and identifies the direction of these lines in the 3D scene, the camera rotation matrix can be recovered (step 410). FIG. 6 shows how this is accomplished using all constraints available and a unit quaternion approach. First, the panorama coordinates of two points ($x_1'$, $x_2'$) on each of the parallel lines designated by the user in the screen image are identified from the corresponding screen image points (step 600). Here again, it is preferred the points correspond to the end points of lines. Given the two points, the projection plane normal ($n_p'$) for each line can be computed, i.e. $n_p'=x_1' \times x_2'$ (step 602). As shown above in the case where two vertical or horizontal lines were designated, given a pair of parallel lines with "line projection plane" normals as $n_{pj}'$ and $n_{pk}'$, the line direction $m_i''$ can be estimated as $n_{pj}' \therefore n_{pk}'$ (step 604). Rather than normalizing $m_i'$, it can be left un-normalized since its magnitude denotes a confidence in this measurement. Given the user-designated true line directions $m_i'$ in the world coordinate and the derived panorama line directions ($m_i'$), the camera orientation matrix estimation can be formulated as:

$$\underset{R}{\operatorname{argmax}} \sum_{i=1}^{N} m_i'' \cdot (R^T m_i') \quad (1)$$

with N≧2, which leads to a maximum eigenvalue problem using unit quaternion (step 608).

However, the resulting camera rotation R can still be ambiguous due to the sign ambiguities in line directions m'.

1.3 Determining The Camera Orientation Matrix (R) When More Than Two Parallel Lines Are Designated In A Set Of Parallel Lines In cases where the user designates more than two parallel lines in a set of parallel lines, a modified procedure can be employed to estimate the camera orientation matrix. For example, if the user were to designate three or more lines on a plane in the screen image and identify all as being vertical lines in the 3D scene, the Z-axis element ($r_z$) of the camera orientation matrix can be formulated as a standard minimum eigenvalue problem, i.e., $$e = \sum_i (n_{pi}' \cdot r_z)^2 \quad (2)$$

as shown in step 504 of FIG. 5B. The X-axis and Y-axis elements of the camera orientation matrix are then computed as described previously.

Similarly, if the user designates three or more horizontal lines, the X-axis element of the camera orientation matrix can be formulated as a standard minimum eigenvalue problem using:

$$e = \sum_i (n_{pi}' \cdot r_x)^2 \quad (3)$$

as shown in step 506 of FIG. 5B. Again, the Z-axis and Y-axis elements of the camera orientation matrix are then computed as described previously.

Finally, the line direction recovery step associated with estimating the camera orientation matrix from at least two sets of parallel lines and their associated 3D scene line directions can be formulated as a standard minimum eigenvector problem. Because each "line projection plane" is perpendicular to the line (i.e., $n_{pi}' \cdot m'=0$), it is desired to minimize:

$$e = \sum_i (n'_{pi} \cdot m')^2 = m^{T'} \left( \sum_i n'_{pi} n^{T'}_{pi} \right) m' \qquad (4)$$

as shown in step 606 of FIG. 6. This is equivalent to finding the vanishing point of the lines [CW90]. It is noted that the parallel lines in a set of lines need not all be on the same plane in the 3D scene. Rather, they could be from more then one plane.

The foregoing error minimization approaches to estimating the camera orientation matrix have significant advantages. First, because the camera orientation matrix computation involves extracting data from potentially noisy panoramic images of a 3D scene, using more lines should provide a better estimate. Another advantage is that the sign ambiguity of $n_{pi}'$ can be ignored in the error minimization formulations.

1.4 Resolving The Sign Ambiguities Associated With The Camera Orientation Matrix Elements ($r_x, r_y, r_z$)

In all the methods for estimating the camera orientation matrix discussed so far, there exists a sign ambiguity resulting from the inherent ambiguity in the direction of the projection plane normals. This ambiguity arises because the user is only required to designate lines in the screen image by specifying two points. These points can be specified in any order, thus the resulting line could have either of two directions. The ambiguity issue is preferably resolved in one of two ways. First, as shown in optional step 404 of FIG. 4A, the user could specify the direction of the designated lines in the panoramic view, thereby preventing the sign ambiguity in the computed projection plane normals. However, this approach is somewhat onerous from the user's perspective as many lines may be specified in modeling a 3D scene in accordance with the present invention. Referring to FIG. 4B, a better approach would be to prompt the user to identify at least two points (e.g. the vertices of a plane) in the screen image and provide their actual 3D scene coordinates (step 412). The 3D coordinates of the designated points are then computed by obtaining their panoramic view coordinates from the screen image and projecting the points into the 3D scene using the previously estimated camera orientation matrix (step 414). The next step 416 of the process is to compare the computed 3D coordinates of the points to the user-specified 3D coordinates. If any of the computed coordinate indices have a different sign from the user-specified coordinates, the sign of the affected camera orientation matrix element is reversed (step 418), thereby resolving any sign ambiguity in the matrix.

2. Estimating Plane Normals

Once the camera orientation matrix has been estimated, the scene geometry (i.e., points, lines, and planes) can be recovered. Because of the bi-linear nature of some constraints (such as points on planes), it is possible to compute plane normals (n) before solving for plane distances (d) and points (x). Of course, rather than computing the plane normal of every plane, at least some may be designated by the user. This could be done by the user identifying a plane in the screen image and specifying the direction of the normal of the corresponding plane in the 3D scene. For example, in a preferred scenario the user might specify that the normal of such a plane is directed north, south, up, down, or otherwise. The computer program would interpret these directions and convert them into the 3D coordinate system for further processing. If the user does not designate a normal for a plane in the 3D scene, it can be computed by finding two line directions on the plane.

Figure 7A:
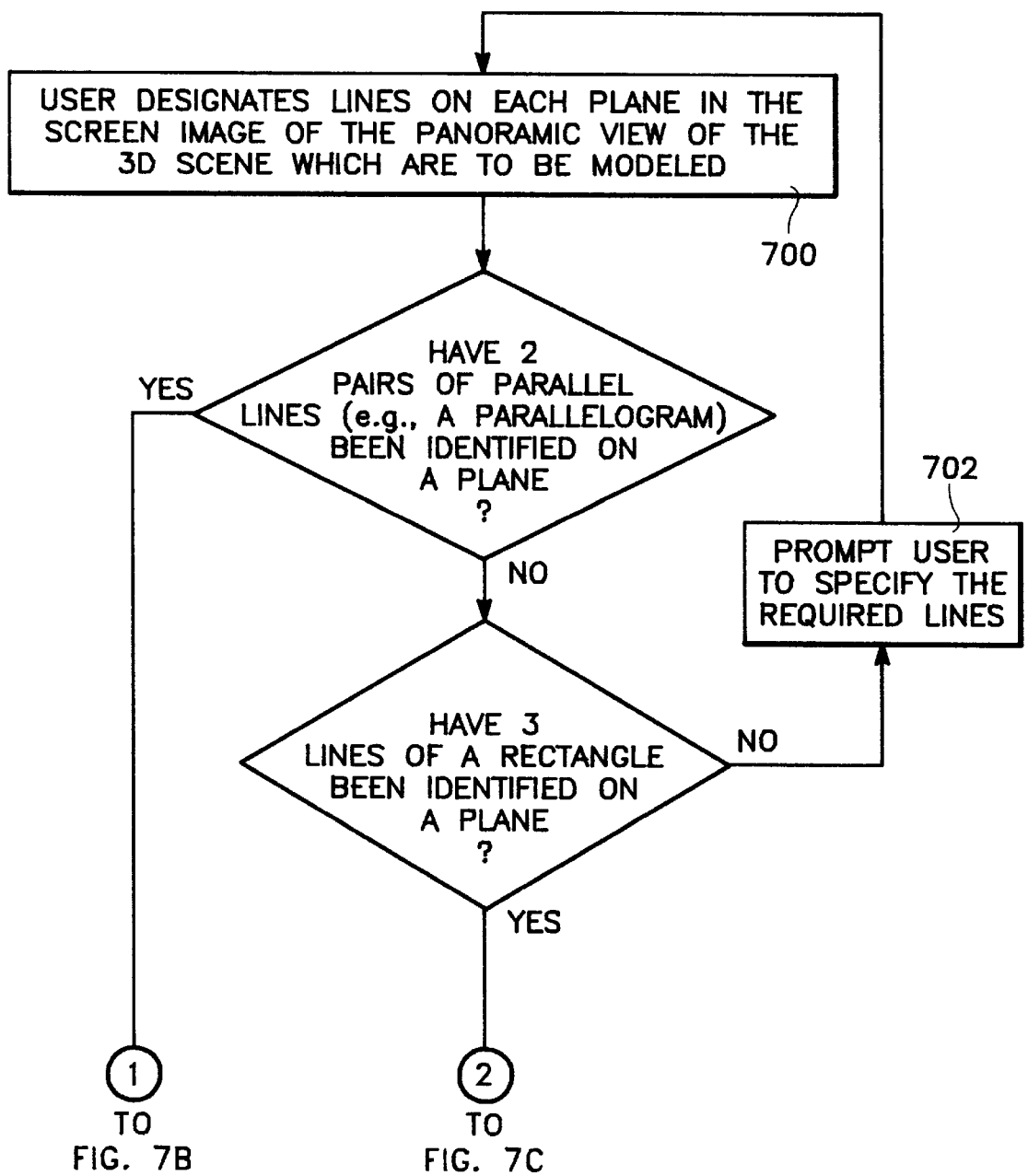
FIGS. 7A through 7D are block diagrams of a process for accomplishing the plane normal and line direction estimation program module of the overall process of FIG. 3.
Figure 7B:
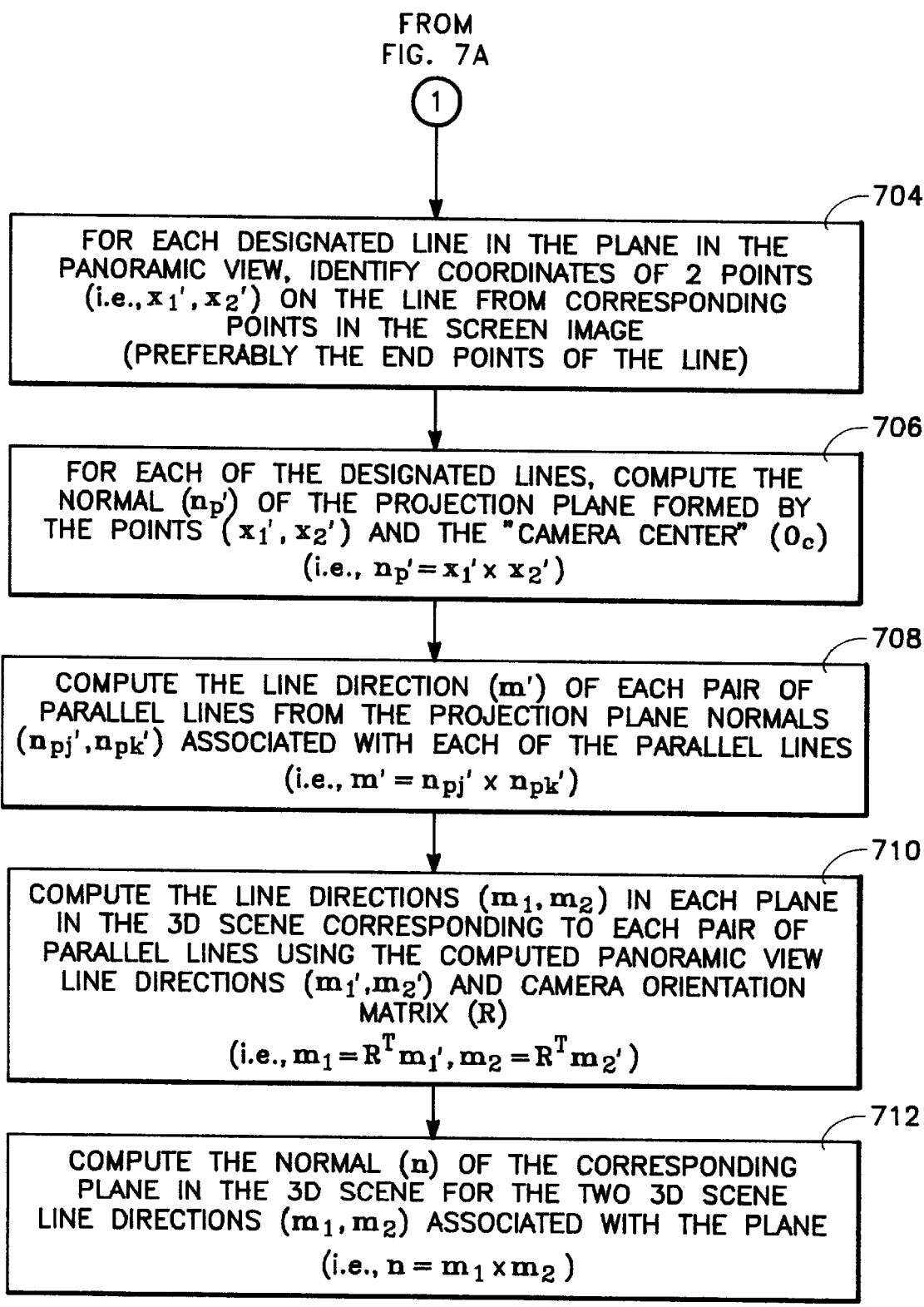

Referring to FIG. 7A & 7B, the first step 700 in a preferred process for estimating the plane normals involves the user designating lines on each plane in the screen image that is to be modeled. This is accomplished as before with the user specifying two points of the line in the screen image—preferably the end point of the line. Specifically, if the user designates two pairs of parallel lines (e.g., a parallelogram) on a plane in the screen image, the plane normal can be recovered. First, the panoramic view coordinates of the two user-specified points ($x_1'$, $x_2'$) for each designated line are taken from their corresponding screen image coordinates (step 704). Next, the projection plane normal ($n_p'$) of each designated line is computed, i.e., $n_p' = x_1' \times x_2'$ (step 706). From the projection plane normals, the line direction (m') of each pair of the parallel lines on each plane being modeled can be computed, i.e., $m' = n_{pj}' \times n_{pk}'$ (step 708). Using the estimated camera orientation matrix (R) and the computed panoramic view line directions ($m_1'$, $m_2'$) associated respectively with the two pairs of parallel lines designated by the user on planes being modeled, the 3D scene line directions ($m_1$, $m_2$) corresponding to the panoramic view line directions can be computed (step 710) as follows:

$$m_1 = R^T m_1' \text{ and } m_2 = R^T m_2' \qquad (5)$$

From the two 3D scene line directions $m_1$ and $m_2$ on each plane, the respective plane normals can be computed as $n = m_1 \times m_2$ (step 712).

Figure 7C:
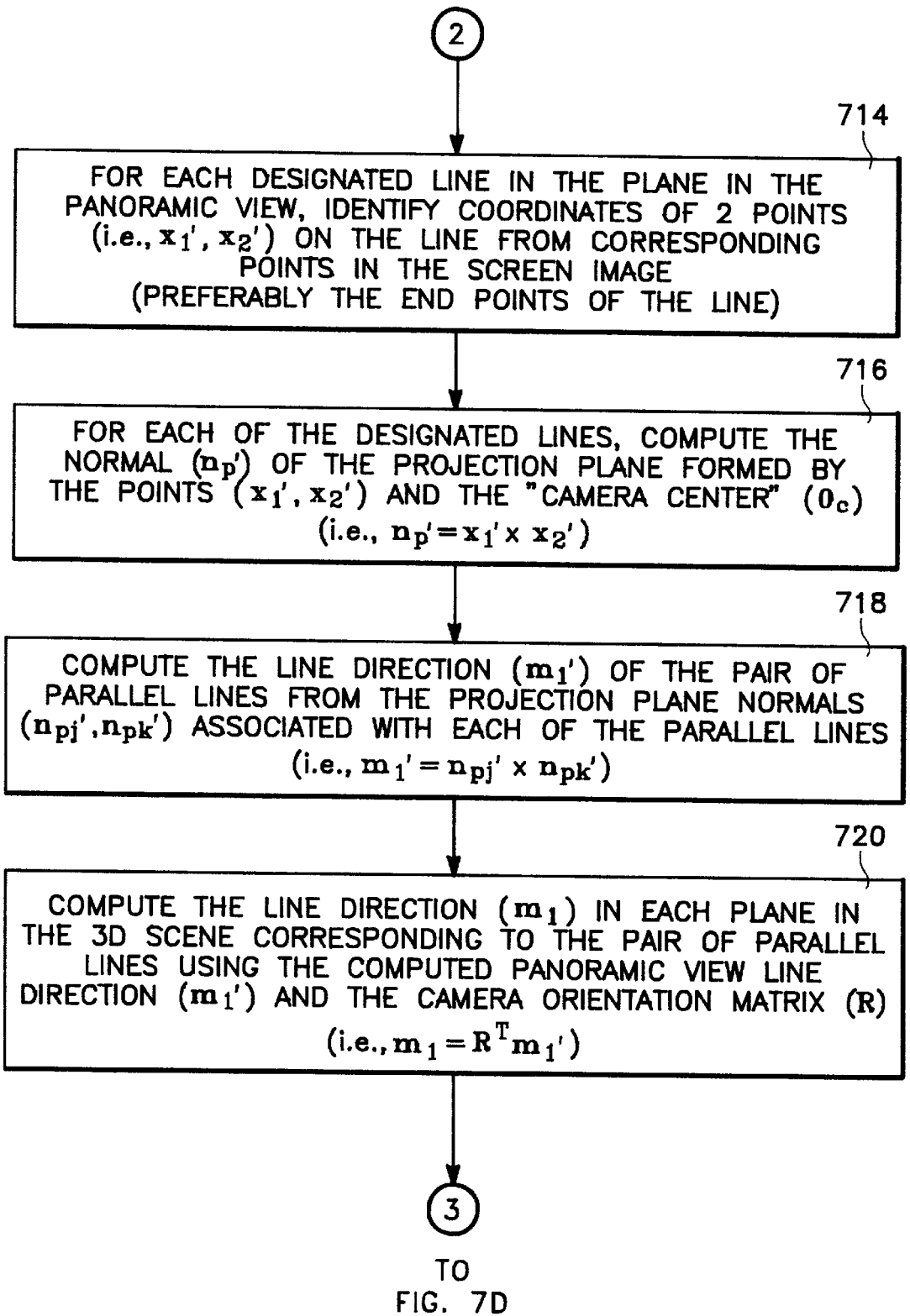
Figure 7D:
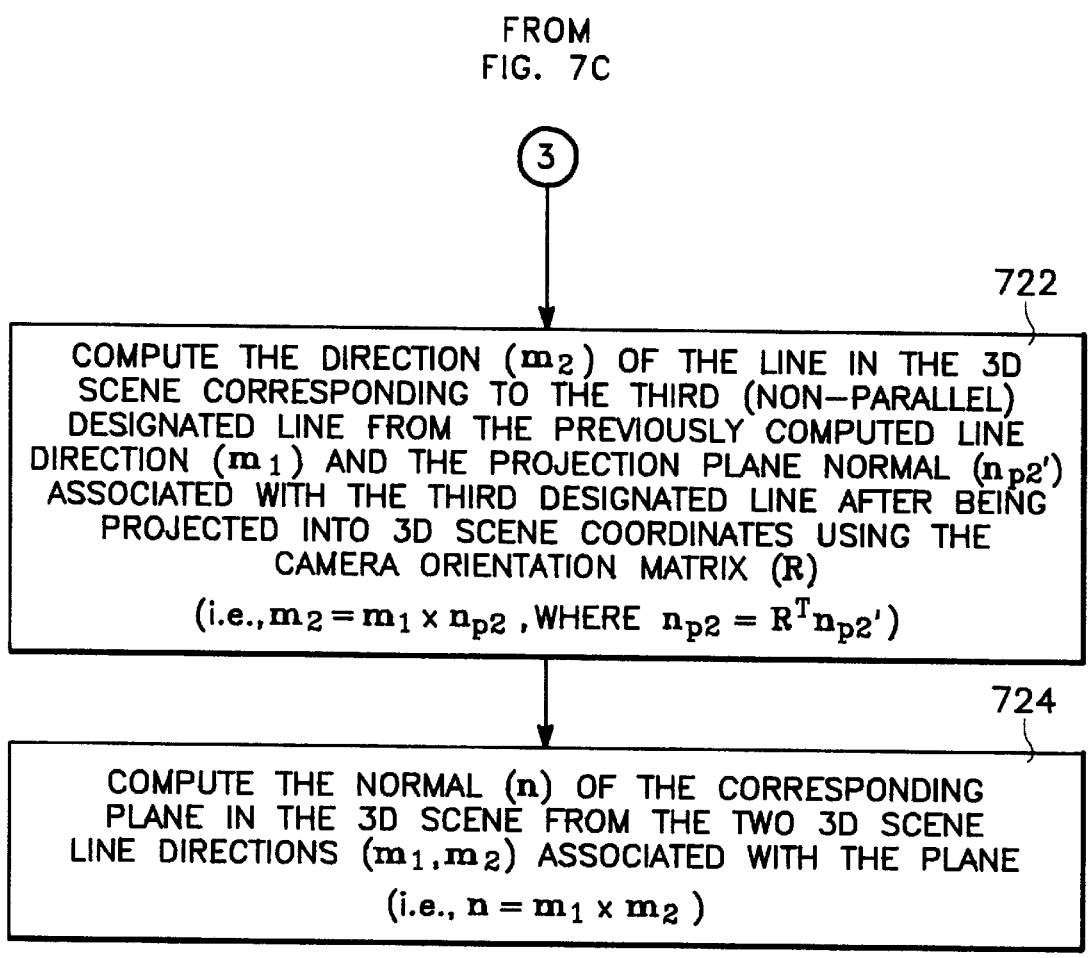

A rectangle is a special case of parallelogram. The plane normal of a 3D scene plane can also be recovered from three lines of the rectangle, as illustrated in FIGS. 7C and 7D. One line direction $m_1$ can be obtained from the two parallel lines designated by the user on a plane in the screen image as part of the aforementioned three lines of the rectangle. As illustrated in steps 714, 716, 718, and 720 of FIG. 7C, this is accomplished in the same way that the line direction ($m_1$) was computed in the previous discussion directed at finding the plane normal using two pairs of parallel lines. In the next step 722 of the process, the line direction ($m_2$) of the line in the 3D scene corresponding to the third (non-parallel) line designated by the user in the screen image of the plane can be found using the other, previously computed line direction ($m_1$) of the plane and the 3D scene projection of the projection plane normal ($n_{p2}'$) associated with the third line in the panoramic view, i.e., $m_2 = m_1 \times n_{p2}$ since $m_1 \cdot m_2 = 0$ and $n_{p2} \cdot m_2 = 0$. The projected normal ($n_{p2}$) is obtained using the camera orientation matrix via the relationship $n_{p2} = R^T n_{p2}'$. As before, the plane normal of the 3D scene plane is computed using $n = m_1 \times m_2$ (step 724).

Using the techniques described above, the surface orientation of an arbitrary plane (e.g., tilted ceiling) can be recovered provided either a parallelogram or rectangle can be "drawn" on the plane in the screen image.

3. Prompting The User To Designate Additional Lines

Up to this point it has been assumed the user has designated a sufficient number of lines on the planes in the screen image to allow both the camera orientation matrix to be determined, and the line directions and plane normals to be derived for each plane that is to be modeled. For example, in the case of estimating the camera orientation matrix, the user must at least designate two vertical lines and one horizontal line associated with the 3D scene (or two horizontal and one vertical) on a plane in the screen image, or at least two sets of parallel lines associated with the 3D scene and their 3D scene directions. Further, in the case of deriving the line directions and plane normals for each plane being modeled, the user must at least designate two sets of parallel lines on each plane in the screen image or alteratively at least three lines of a rectangle. Therefore, it is preferred that the process embodying the present invention include the capability to ascertain if a sufficient number of lines has been specified in accordance with the foregoing minimum requirements, and prompt the user via an appropriate screen image to designate additional lines (step 408 of FIG. 4A and step 702 of FIG. 7A), whenever a sufficient number of lines has not been supplied.

4. Recovering Camera Translation

A point on a 2D model (panorama) represents a ray from the camera origin through the pixel on the image. This constraint can be expressed in different ways. For example, each point in 3D model can be related to its 2D counterpart by a scale k, i.e., $$(x-t)=k\, R^T x' \tag{6}$$

Figure 8:
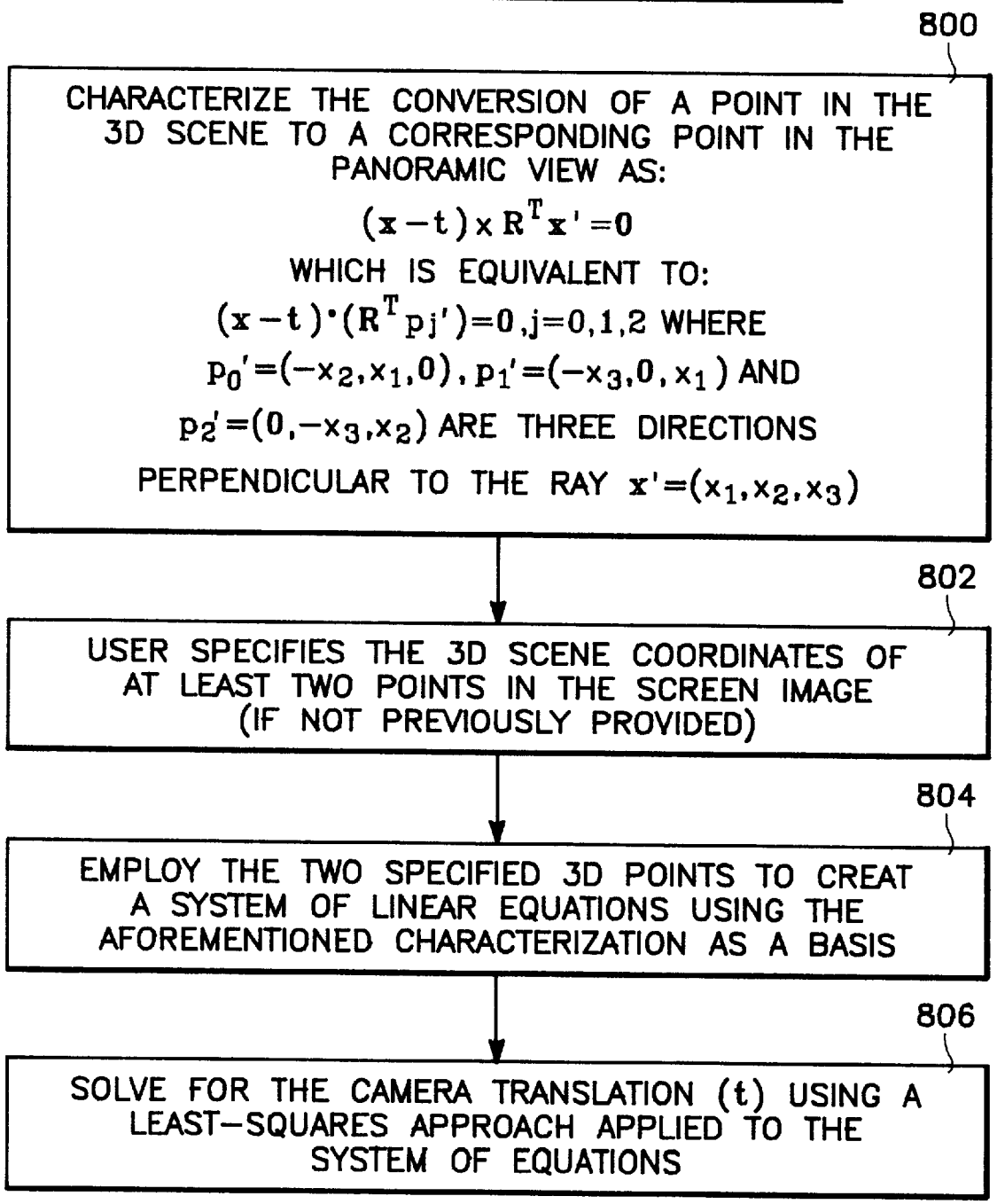
FIG. 8 is a block diagram of a process for accomplishing the camera translation recovery program module of the overall process of FIG. 3.

Alternatively, the 3D point should lie on the ray represented by the 2D point. Therefore, referring to step 800 of FIG. 8, the conversion of the 3D scene coordinates of a point in the 3D scene to the panoramic view coordinates of a corresponding point in the panoramic view can be characterized by:

$$(x-t) \times R^T x' = 0 \tag{7}$$

which is equivalent to $$(x-t)\cdot(R^T p_j')=0, j=0,1,2 \tag{8}$$

where $p_0'=(-x_2, x_1, 0)$, $p_1'=(-x_3, 0, x_1)$ and $p_2'=(0, -x_3, x_2)$ are three directions perpendicular to the ray $x'=(x_1, x_2, x_3)$. Note that only two of the three constraints are linearly independent: The third constraint with minimum $\|p_j'\|^2$ can be eliminated. Thus, camera translation t can be recovered as a linear least-squares problem if the user specifies the corresponding 3D scene coordinates of two or more points in the screen image (step 802). This is accomplished by employing the specified 3D point coordinates to create a system of linear equations using the aforementioned conversion characterization (step 804). The camera translation (t) is then found by using a conventional least squares approach applied to the system of equations (step 806). In practice, it is convenient to fix a few points, including the 3D model origin (0, 0, 0). These same points can also be used to eliminate the ambiguities in recovering camera orientation matrix as previously described.

For a single panorama, the camera translation (t) is set to zero if no point in 3D model is given. This implies that the camera coordinate coincides with the 3D model coordinate. It should be pointed out that it is not necessary to recover camera translation independently. Rather, the camera translation can be solved for along with plane distances and points as shown in the next section.

5. Estimating the 3D Model 5.1 Creating A Linear System Of Constraint Equations

The model of the 3D scene constructed in accordance with the present invention consists of one or more subsystems (connected components) each represented by a set of connected planes. Each of these sets of connected planes is characterized using a linear system of geometric constraint equations and solved independently. For example, when modeling a room with an object, such as a computer monitor, floating in space and not connected with any wall, the ceiling or floor of the room, the 3D scene consists of two subsystems, i.e. the room itself and the computer monitor. As such the room would be characterized by a system of linear constraint equations and the computer monitor would be characterized by a separate system of linear constraint equations. Each system of equations would then be solved independently and the resulting 3D models combined to model the entire 3D scene.

Figure 9A:
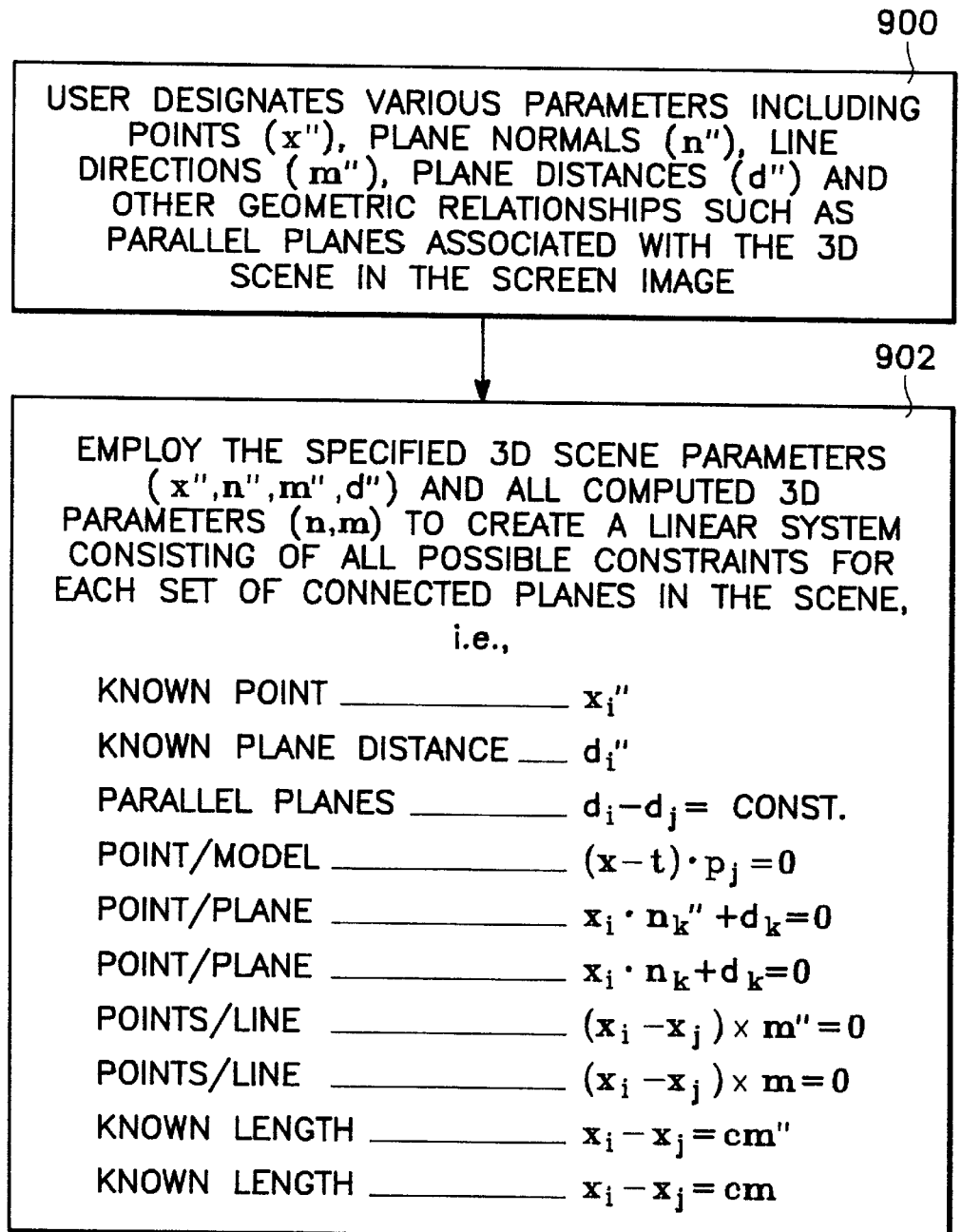
FIGS. 9A through 9D are block diagrams of a process for accomplishing the plane distance, vertex point location, and optional camera translation recovery program module of the overall process of FIG. 3, including steps for characterizing each constraint equation as a hard or soft constraint and decomposing each system of linear constraint equations to ensure its solvability.

Referring to FIG. 9A, each subsystem to be modeled in the 3D scene is characterized by a linear system of geometric constraint equations as follows. Preferably, the user designates 3D scene parameters such as known point locations (x"), plane normals (n"), line directions (m"), or plane distances (d"), as well as other geometric relationships including a designation that two planes are parallel to each other (step 900) in the 3D scene (e.g., opposite walls of a square room). The previously computed 3D plane normals (n) and line directions (m) of each plane in a subsystem are then used to form the linear system of constraint equations for that subsystem, along with the aforementioned user-designated 3D scene parameters (step 902).

Table 1 lists the geometric constraint equations used in a preferred modeling system embodying the present invention. It is noted that here again that the notations x", n", m", and d" are the used to represent user-specified parameters associated with planes of the 3D scene. In addition, the third column designator "n" of Table 1 refers to the number of constrains associated with the equation.

TABLE 1

| Type | Constraint | n |
| --- | --- | --- |
| Known point | $x_i'$ | 3 |
| Known plane Distance | $d_i'$ | 1 |
| ‖ planes | $d_i - d_j$ | 1 |
| Point/model | $(x - t) \cdot p_j = 0$ | 2 |
| Point/plane | $x_i \cdot n_k' + d_k = 0$ or | 1 |
|  | $x_i \cdot n_k + d_k = 0$ | 1 |
| Points/line | $(x_i - x_j) \times m' = 0$ or | 2 |
|  | $(x_i - x_j) \times m = 0$ | 2 |
| Known length | $x_i - x_j = cm'$ or | 3 |
|  | $x_i - x_j = cm$ | 3 |

5.2 Employing a Hard and Soft Constraints Designations

The foregoing preferred process, which was the subject of the previously mentioned co-pending application entitled INTERACTIVE CONSTRUCTION OF 3D MODELS FROM PANORAMIC IMAGES, produces a system of linear constraint equations that can be solved using a conventional least squares approach to obtain the unknown plane distances and vertex point locations (and possibly the camera translation). This will provide a model of the 3D scene that is sufficiently accurate for many applications. However, it is possible to refine the process to provide a more accurate model using systems and processes embodying the present invention. First, it is noted that the foregoing process affords constraints having estimated parameters, which have been based on potentially noisy panoramic images, the same weight as those including typically more accurate user-specified parameters. By giving the constraint equations having user-specified parameters a higher priority when solving for the unknowns, it is believed a more accurate model can be obtained.

Figure 9B:
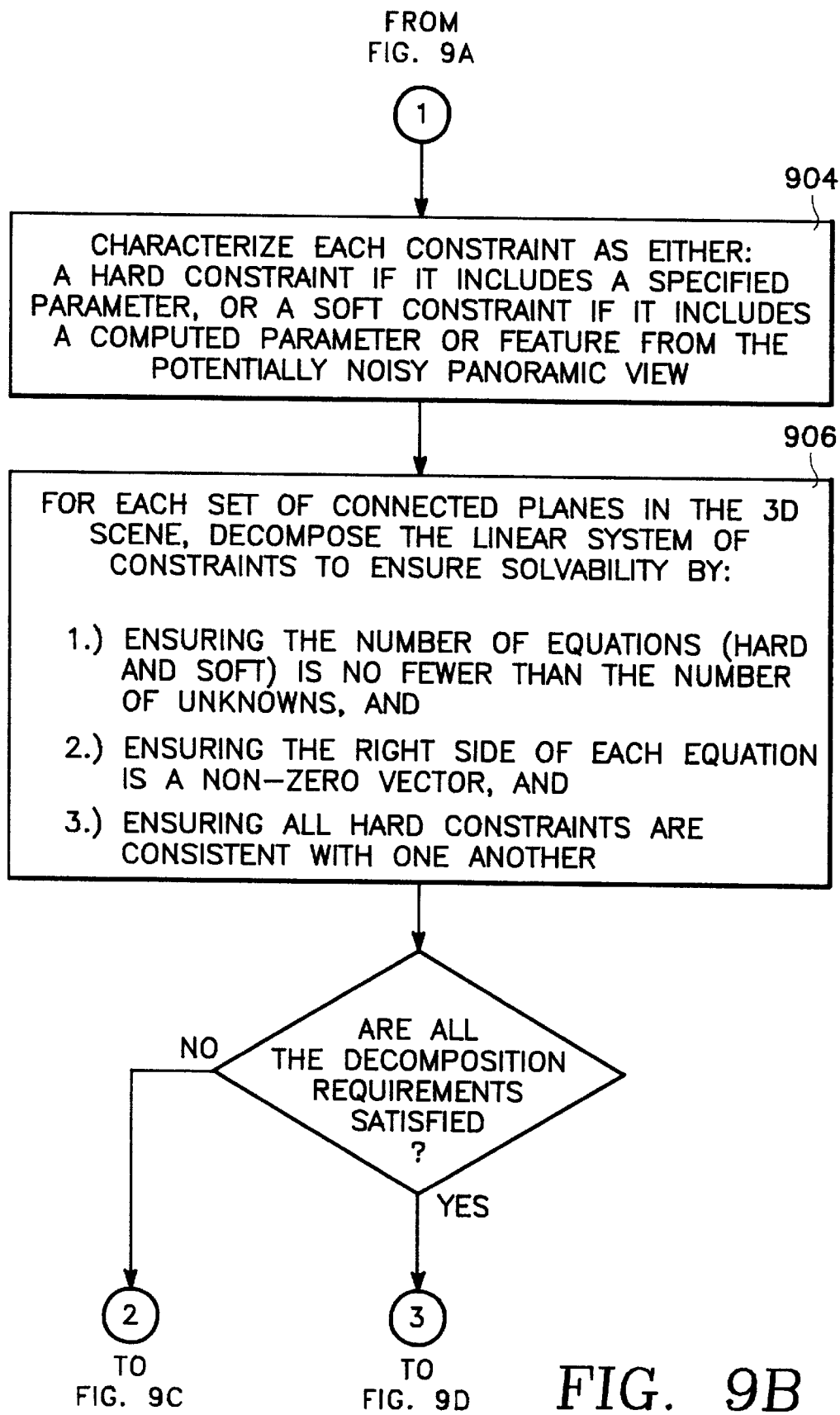

Referring to FIG. 9B, this refinement is accomplished by characterizing a constraint as a hard constraint if it includes a user-specified parameter and a soft constraint if it includes only estimated parameters (step 904). The result is a least squares system with equality constraints.

Table 2 lists the geometric constraints used in a preferred modeling system employing equality constraints. Table 2 is similar to Table 1 except that those constrains associated with the user-specified parameters have been designated as hard constraints and those constraints based on estimated parameters are designated as soft constrains. Again, the notations x", d", m" and n" are used to represent the user-specified parameters.

TABLE 2

| Type | Constraint | n | Soft | Hard |
|------|-----------|---|------|------|
| Known point | $x_i"$ | 3 | | x |
| Known plane | $d_i"$ | 1 | | x |
| Distance ‖ planes | $d_i - d_j$ | 1 | | x |
| Point/model | $(x - t) \cdot p_j = 0$ | 2 | x | |
| Point/plane | $x_i \cdot n_k" + d_k = 0$ | 1 | | x |
| Point/plane | $x_i \cdot n_k + d_k = 0$ | 1 | x | |
| Points/line | $(x_i - x_j) \times m" = 0$ | 2 | | x |
| Points/line | $(x_i - x_j) \times m = 0$ | 2 | x | |
| Known length | $x_i - x_j = cm"$ | 3 | | x |
| Known length | $x_i - x_j = cm$ | 3 | x | |

As an example of the advantages of the hard-soft classification scheme, consider a point on a plane. If the plane normal $n_k'$ is specified by the user, the constraint $(x_i \cdot n_k' + d_k = 0)$ is considered as hard. This implies that the point has to be on the plane and that only its location can be adjusted. On the other hand, if the plane normal $n_k$ is estimated, the constraint $(x_i \cdot n_k + d_k = 0)$ is considered soft because the inherent inaccuracies involved in the estimation process could result in deriving a point that is not on the plane at all. Thus, an inaccurate model may result if some of the estimated normals have errors.

5.3 Solving The System Of Linear Constraint Equations Using An Equality-Constrained Least Squares Approach An equality-constrained least squares approach entails solving the linear system (soft constraints)

$$Aw=b \quad (9)$$

subject to (hard constraints)

$$Cw=q \quad (10)$$

where A is m×n, C is p×n, and w denotes an unknown.

A preferred way to solve the above problem is to use QR factorization [GV96]. Suppose C is of full rank. Let $$C^T = Q\begin{bmatrix} R \\ 0 \end{bmatrix} \quad (11)$$

be the QR factorization of $C^T$ where Q (n x n) is orthogonal, $QQ^T = I$, and R is p×p. Defining $$Q^T w = \begin{bmatrix} w_1 \\ w_2 \end{bmatrix}, AQ = (A_1, A_2) \quad (12)$$

where $A_1$ is m×p, $A_2$ is m×(n−p), $w_1$ is p×1, and $w_2$ is (n−p)×1, $w_1$ can be recovered because R is upper triangular and $$Cw=CQQ^T w=R^T w=q \quad (13)$$

Then $w_2$ can be obtained from the unconstrained least-squares $\|A_2 w_2 - (b - A_1 w_1)\|^2$ because $$Aw - b = AQQ^T w - b \quad (14)$$
$$= A_1 w_1 + A_2 w_2 - b$$
$$= A_2 w_2 - (b - A_1 w_1).$$

Finally $$w = Q\begin{bmatrix} w_1 \\ w_2 \end{bmatrix}.$$

If C is not of full rank, other approaches such as the elimination method [SS97a] can be employed.

Figure 9C:
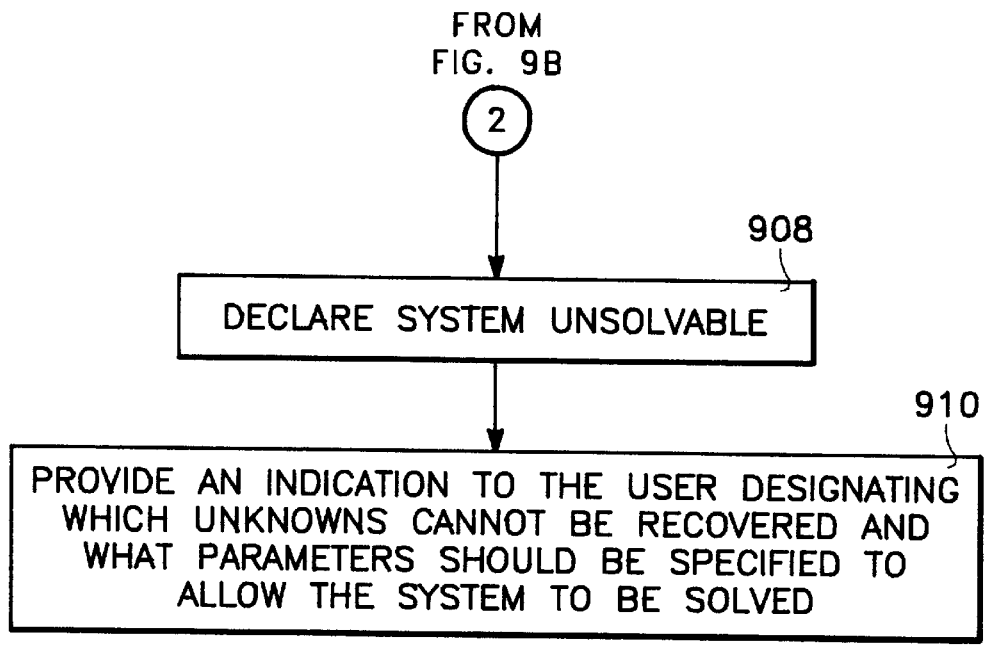
Figure 9D:
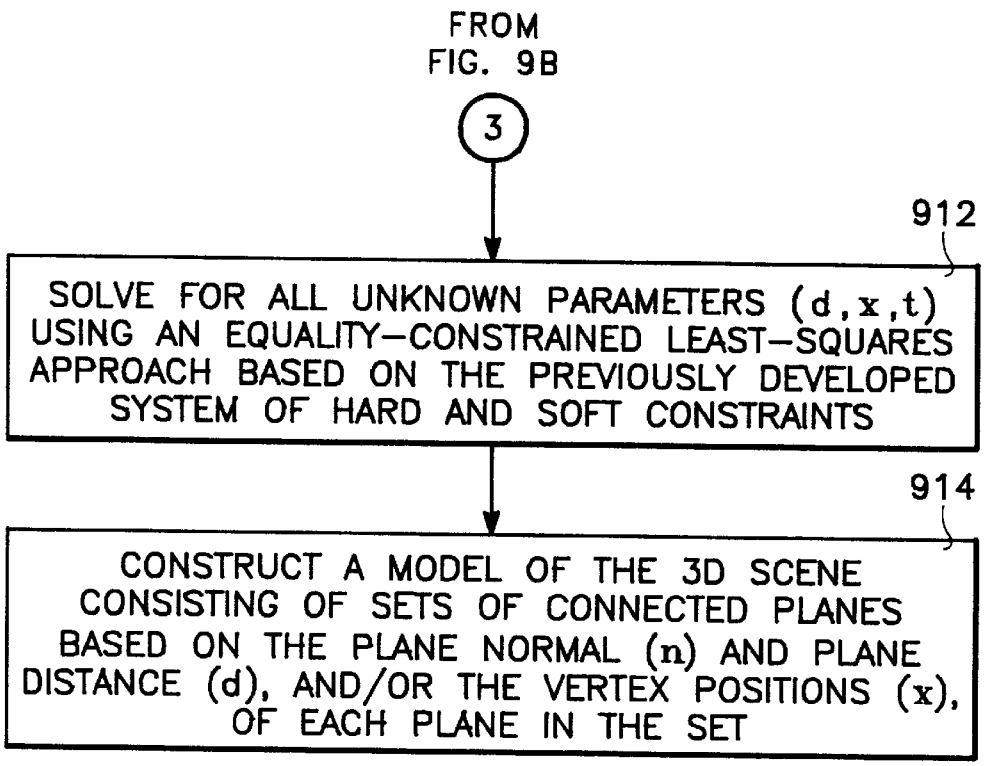

Using the foregoing equality-constrained least squares approach, each system of linear constraint equations is solved to estimate all the unknown parameters associated with the planes of the 3D scene, i.e., the plane distances (d) and 3D vertex point locations (x) of each plane, as well as the camera translation (t) if it has not been previously recovered (step 912 of FIG. 9D). The model of the 3D scene can then be constructed using the previously estimated and user-designated plane normals (n) and plane distances ( a), and/or the 3D vertex point locations (x), of each plane in each subsystem in the scene (step 914).

While the equality-constrained least squares approach employing QR factorization is preferred, it is noted that a weighted least squares approach could be employed instead. In this latter approach, soft constraints are assigned a unity weight, whereas hard constraints are assigned very large weights [GV96]. Theoretically, the hard constraints should be assigned a weight of infinity. However, for computational purposes a large number would be chosen instead—for example a weight of 1000. Once the weights are assigned, the unknowns are solved for using a conventional least squares computation.

5.4 Decomposing the Linear System

Before a system solver is applied to any of the previously described systems of constraint equations, it is preferred that the linear system formed by the geometric constraints be checked to ensure it is solvable. To find all connected components, a depth first search is used to step through the linear system. Referring to step 906 of FIG. 9B, for each subsystem being modeled, check that:

the number of equations (both hard and soft constraints, when applicable) is no fewer than the number of unknowns;

the right hand side of each constraint equation is a non-zero vector, i.e., some minimal ground truth data has been provided; and the hard constraints are consistent (whenever the constraints have been categorized as hard or soft).

In regard to the consistency of the hard constraints, one preferred method of accomplishing this is through the QR decomposition of C=QR or $Rw=Q^T q$ to check if all zero rows of R correspond to zero entries of $Q^T q$.

As illustrated in FIG. 9C, if any of the above requirements is not satisfied, the system is declared unsolvable (step 908). A warning message is then generated to indicate to the user which set of unknowns cannot be recovered and possibly what parameters the user could specify to allow the subsystem to be modeled (step 910).

6. Experiments

Figure 10A:
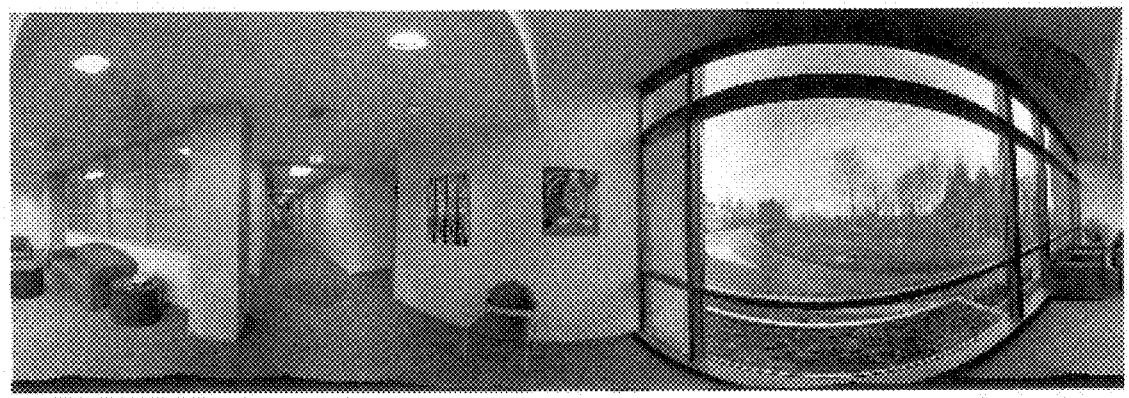
FIG. 10A is an image depicting a spherical panoramic view of a building interior.
Figure 10B:
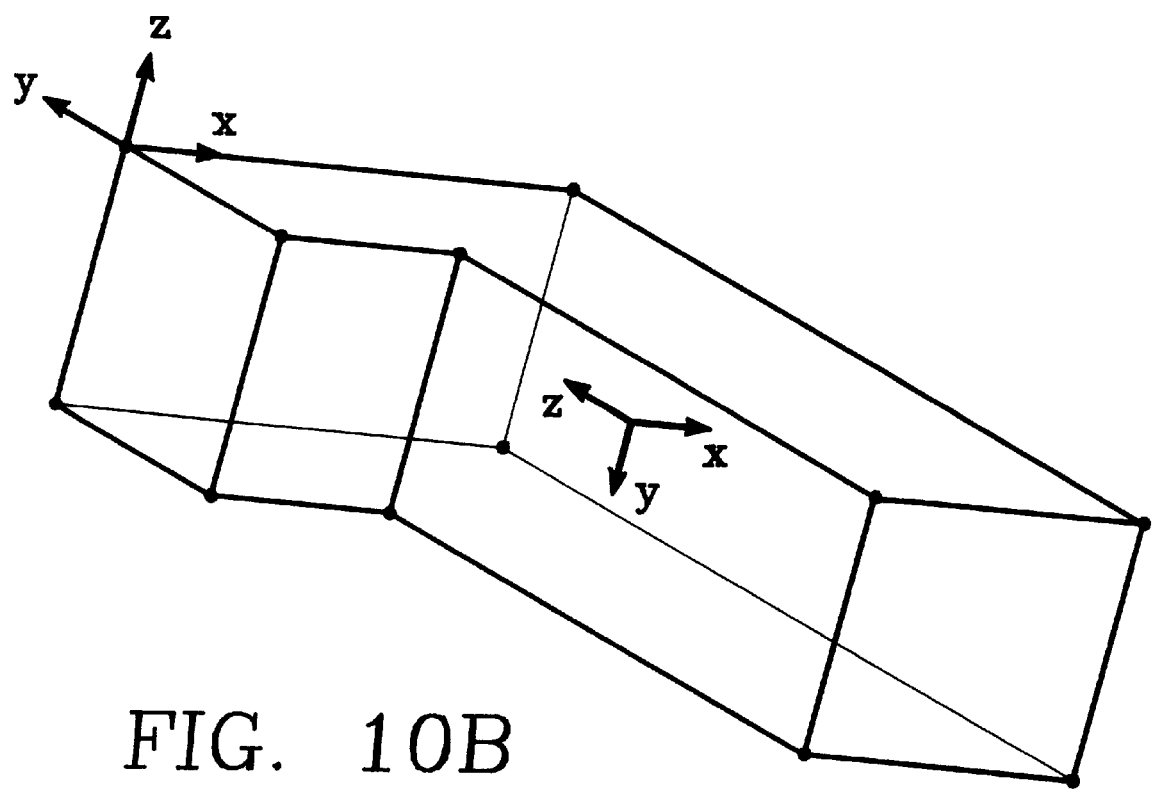
FIG. 10B is a diagram graphically depicting a simple reconstructed model of the 3D scene associated with the panoramic image of FIG. 10A, produced using a modeling system embodying the present invention.

We have implemented and tested our system on a PC, such as the one described in connection with FIG. 1. For example, FIG. 10A shows a spherical panoramic view of a building interior (i.e. the 3D scene) and FIG. 10B shows a simple reconstructed 3D model produced from the panoramic view using a modeling system embodying the present invention. The coordinate system on the left corner in FIG. 10B is the world coordinate, and the coordinate system in the middle is the panoramic view coordinate. The panoramic view of FIG. 10A is composed of 60 images that have been combined using a known method of creating full-view panoramas [SS97a] from individual images of a scene.

Figure 11A:
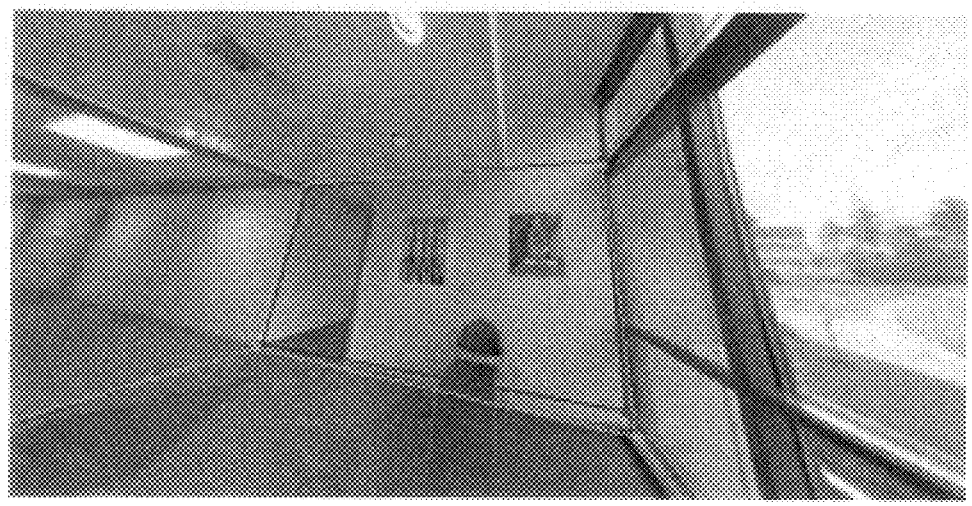
FIGS. 11A & 11B are images depicting zoomed and panned screen images of the interior scene shown in the panoramic view of FIG. 10A.
Figure 11B:
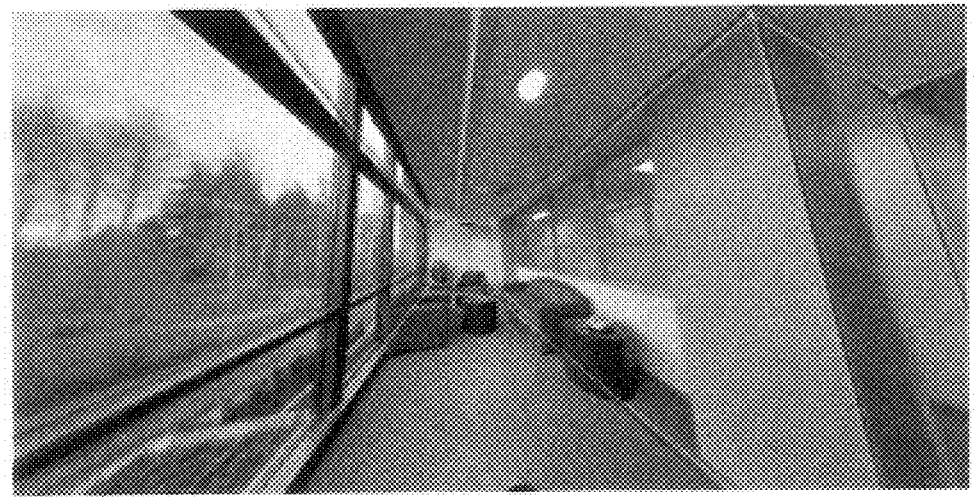

FIGS. 11A and 11B represent two zoomed and panned screen images of the interior scene shown in the panoramic view of FIG. 10A. Green lines and points are a sampling of the 2D panoramic view items that are manually "drawn" by the user on the screen image and assigned with 3D scene properties (e.g., 3D scene line directions and point coordinates), as described previously. The blue lines and points are projections of the recovered 3D model. It was found that this interactive, user interface was easy to use. For example, it took only about 15 minutes to build the simple model in FIG. 10B.

As can be seen from FIGS. 10A, 10B, 11A and 11B, the present invention utilizes a user interface environment including screen images of a panoramic view of a 3D scene. The interface allows the user to select portions of the panoramic view to be displayed as the screen image (such as was done in FIGS. 11A and 11B). Essentially, the user can input commands to pan to a particular portion of the panoramic view, tilt the image vertically to view just a portion thereof, and zoom in or out on a portion of the view. In addition, the interface allows a user to employ a pointing method (such as a mouse, touch sensitive screen, etc.), in a conventional manner to identify features, such as lines and points, on the screen image. For example, as discussed previously, the user designates a line by identifying two points of the line on the screen image. A line then appears (e.g., the green lines shown in FIGS. 11A and 11B) on the screen image between the two specified points. A point can be depicted in much the same way. The user identifies a point on the screen image and a dot appears at that location. In addition, the user would preferably assign properties to identified features by making selections on, or entering information via a keyboard, etc. into, a conventional graphical screen image (not shown), similar to those currently used by commercially available graphic user interfaces such as Microsoft Windows™. For example, the user would preferably enter 3D scene line directions and point coordinates via this method.

In regard to the process of the user designating lines on the screen image, it is noted that a line snapping technique can be employed in an attempt to increase the accuracy of the positioning of lines on the screen image. In a typical line snapping technique, the user would first specify the two points of the line (preferably the end points) and a line would be "drawn" on the screen image between the points, as discussed above. In cases where the line coincides with a readily definable feature of the 3D scene (such as a window frame, corner of room or building, or the like), conventional edge detection methods would be employed to fit (i.e., "snap") the line to the edge. This may result in the shifting of the user-identified points to new locations on the screen image. These new point locations would be used in the previously described computation steps rather than the user-specified point locations, thereby potentially resulting in a more user-friendly and accurate modeling of the 3D scene.

References

[BB95] S. Becker and V. M. Bove. Semiautomatic 3-D model extraction from uncalibrated 2-D camera views. In *SPIE Vol.* 2410, *Visual Data Exploration II*, pages 447–461, Feb. 1995.

[BR97] S. Bougnoux and L. Robert. Totalcalib: a fast and reliable system for off-line calibration of image sequences. In *CVPR'97*, June 1997. The Demo Session.

[CW90] R. T. Collins and R. S. Weiss. Vanish point calculation as a statistical inference on the unit sphere. In *ICCV'90*, pages 400–403, Dec. 1990.

[FSL+95] O. D. Faugeras, Laveau S., Robert L., Csurka G., and Zeller C. 3-D reconstruction of urban scenes from sequences of images. Technical Report 2572, INRIA, 1995.

[GV96] G. Golub and C. F. Van Loan. *Matrix Computation, third edition*. The John Hopkins University Press, 1996.

[Har89] R. M. Haralick. Determining camera parameters from the perspective projection of a rectangle. *Pattern Recognition*, 22(3):225–230, 1989.

[KS96] S. B. Kang and R. Szeliski. 3-D scene data recovery using omnidirectional multibaseline stereo. In *CVPR'96*, pages 364–370, June 1996.

[KW97] S. B. Kang and R Weiss. Characterization of errors in compositing panoramic images. In *CVPR'97*, pages 103–109, June 1997.

[MB95] L. McMillan and G. Bishop. Plenoptic modeling: An image-based rendering system. *SIGGRAPH'95*, pages 39–46, August 1995.

[SK97] H. S. Sawhney and R. Kumar. True multi-image alignment and its application to mosaicing and lens distortion correction. In *CVPR'97*, pages 450–456, June 1997.

[SS97a] H.-Y. Shum and R. Szeliski. Construction and refinement of panoramic mosaics with global and local alignment. In *ICCV'98*, pages 953–958,1998.

[SS97b] R. Szeliski and H. Y. Shum. Creating full view panoramic image mosaics and texture-mapped models. *SIGGRAPH'95*, pages 251–258, August 1997.

[Ste95] G. Stein. Accurate internal camera calibration using rotation, with analysis of sources of error. In ICCV95, pages 230–236, June 1995.

[TDM96] C. J. Taylor, P. E. Debevec, and J. Malik. Reconstructing polyhedral models of architectural scenes from photographs. In *ECCV'96*, volume 2, pages 659–668, April 1996.

[WH88] E. L. Walker and M. Herman. Geometric reasoning for constructing 3D scene descriptions from images. *Artificial Intelligence*, 37:275–290, 1988.

What is claimed is:

1. A computer-implemented process to construct a model of a 3D scene from a single panoramic view of the scene, comprising using a computer to perform the following steps:

displaying an image of the single panoramic view of the 3D scene as a screen image;

recovering a camera orientation matrix of the single panoramic view based on lines associated with at least one plane of the 3D scene as specified, by a user of the computer-implemented process;

characterizing the 3D scene as at least one set of connected planes, each set being subject to a series of geometric constraints;

estimating plane normals and line directions for planes in the 3D scene which are to be modeled using the camera orientation matrix;

recovering a camera translation using the camera orientation matrix, wherein the camera translation is the difference between the camera projection center and the coordinate origin of the 3D scene;

estimating unknown plane distances and vertex point locations, for each plane in the 3D scene which is to be modeled, by solving a system of linear geometric constraint equations created using the estimated plane normals and line directions, as well as user designated parameters comprising points, plane normals T line directions, plane distances and parallel planes, wherein the constraint equations have been characterized as being a hard constraint whenever the equation includes at least one of the user designated parameters and a soft constraint whenever the equation does not include a user designated parameter; and constructing a model of the 3D scene consisting of at least one set of connected planes based on the plane normal and plane distance, and/or the vertex point locations, of each plane in the set.

2. The process of claim 1, wherein the step of estimating plane distances and vertex point locations for each plane in the 3D scene which is to be modeled comprises the step of the user designating ones of:

3D scene coordinates of points corresponding to points identified by the user in the screen image;

plane normals associated with planes in the 3D scene that correspond to planes identified by the user in the screen image;

directions of lines in the 3D scene that correspond to lines identified by the user in the screen image;

plane distances associated with planes in the 3D scene that correspond to planes identified by the user in the screen image; and planes in the screen image that correspond to parallel planes of the 3D scene.

3. The process of claim 1, wherein the system of linear geometric constraint equations comprises:

| | |
|---|---|
| Known point | $x_i''$, |
| Known plane Distance | $d_i''$, |
| Parallel planes | $d_i - d_j = \text{Const.}$, |
| Point/model | $(x - t) \cdot p_j = 0$, |
| Point/plane | $x_i \cdot n_k'' + d_k = 0$, |
| Point/plane | $x_i \cdot n_k + d_k = 0$, |
| Points/line | $(x_i - x_j) \times m'' = 0$, |
| Points/line | $(x_i - x_j) \times m = 0,0$ |
| Known length | $x_i - x_j = cm''$, |
| Known length | $x_i - x_j = cm$ | where x" represents the coordinates of a point in the 3D scene designated by the user and x represents the unknown coordinates of a point in the 3D scene, d" represents a distance from the origin of the 3D scene to a plane in the scene as designated by the user and d represents an unknown distance from the origin of the 3D scene to a plane in the scene, t represents the camera translation, $p_j$ represents $p_0=(-x_2, x_1, 0)$, $p_1=(-x_3, 0, x_1)$ and $p_2=(0, -x_3, x_2)$ which correspond to three directions perpendicular to a ray from the camera center through the point $x=(x_1, x_2, x_3)$, n" represents a normal of a plane in the 3D scene designated by the user and n represents the estimated normal of a plane in the 3D scene, m" represents a direction of a line in the 3D scene designated by the user and m represents the estimated direction of a line in the 3D scene, and c represents a scaling factor.

4. The process of claim 1, wherein the camera translation has been previously estimated and the step of estimating plane distances and vertex point locations further comprises using the estimated camera translation to create the system of equations.

5. The process of claim 1, wherein the camera translation is unknown and estimated along with the unknown plane distances and vertex point locations from the system of linear geometric constraint equations.

6. The process of claim 1 further comprising, prior to performing the step of estimating the unknown plane distances and vertex point locations for each set of connected planes in the 3D scene, the step of decomposing the system of linear geometric constraint equations for each set of connected planes to ensure their respective solvability, said decomposing step comprising the step of imposing at least one requirement which when met is indicative of the solvability of the system of equations.

7. The process of claim 6, wherein the imposing step comprises ensuring the number of equations in each system of equations is no fewer than the number of unknowns.

8. The process of claim 6, wherein the imposing step further comprises ensuring the right side of each equation in each system of equations is a non-zero vector.

9. The process of claim 6, wherein the imposing step comprises ensuring all hard constraints are consistent with one another.

10. The process of claim 6, wherein the decomposing step further comprises declaring any system of equations unsolvable if the at least one solvability requirement is not met.

11. The process of claim 10, wherein the decomposing step further comprises providing an indication to the user of which unknown plane distances and/or vertex point locations cannot be estimated whenever a system of equations is declared unsolvable.

12. The process of claim 10, wherein the decomposing step further comprises indicating to the user what user designatable information could be entered to allow the system to be solved whenever a system of equations is declared unsolvable.

13. The process of claim 1, wherein the step of estimating plane distances and vertex point locations comprises using an equality-constrained least squares approach wherein the equations of each system of equations characterized as soft constraints are solved subject to the equations of the system characterized as hard constraints.

14. The process of claim 1, wherein the step of estimating plane distances and vertex point locations comprises the steps of:

assigning a unity weight factor to all soft constraints and a large weight factor to all hard constraints; and estimating the unknown plane distances and vertex points for each set of connected planes in the 3D scene which is to be modeled from the weighted system of linear hard and soft constraint equations using a least-squares approach.

15. A computer-implemented process to construct a model of a 3D scene from a single panoramic view of the scene, comprising using a computer to perform the following steps:

displaying an image of the single panoramic view of the 3D scene as a screen image;

recovering a camera orientation matrix of the single panoramic view based on lines associated with at least one plane of the 3D scene as specified by a user of the computer-implemented process;

characterizing the 3D scene as at least one set of connected planes, each set being subject to a series of geometric constraints;

estimating plane normals and line directions for planes in the 3D scene which are to be modeled using the camera orientation matrix exclusive of those provided by the user;

recovering a camera translation using the camera orientation matrix, wherein the camera translation is the difference between the camera projection center and the coordinate origin of the 3D scene;

estimating unknown plane distances and vertex point locations, for each plane in the 3D scene which is to be modeled, by solving a system of linear geometric constraint equations created using the estimated plane normals and line directions, as well as user designated parameters comprising points, plane normals, line directions, plane distances and parallel planes;

constructing a model of the 3D scene consisting of at least one set of connected planes based on the plane normal and plane distance, and/or the vertex point locations, of each plane in the set.

16. The process of claim 15 further comprising, prior to performing the step of estimating the unknown plane distances and vertex point locations for each set of connected planes in the 3D scene, the step of decomposing the system of equations for each set of connected planes to ensure their respective solvability, said decomposing step comprising the step of imposing at least one requirement which when met is indicative of the solvability of the system of equations.

17. The process of claim 16, wherein the imposing step comprises ensuring the number of equations in each system of equations is no fewer than the number of unknowns.

18. The process of claim 16, wherein the imposing step further comprises ensuring the right side of each equation in each system of equations is a non-zero vector.

19. The process of claim 16, wherein the decomposing step further comprises declaring any system of equations unsolvable if the at least one solvability requirement is not met.

20. The process of claim 19, wherein the decomposing step further comprises providing an indication to the user of which unknown plane distances and/or vertex point locations cannot be estimated whenever a system of equations is declared unsolvable.

21. The process of claim 19, wherein the decomposing step further comprises indicating to the user what user designatable information could be entered to allow the system to be solved whenever a system of equations is declared unsolvable.

22. A system for constructing a model of a 3D scene from a single panoramic view of the scene, comprising:

a general purpose computing device; and a computer program comprising program modules executable by the computing device, wherein the computing device is directed by the program modules of the computer program to, display an image of the single panoramic view of the 3D scene on a computer monitor screen, recover a camera orientation matrix of the single panoramic view based on lines associated with at least one plane of the 3D scene as specified by a user of the computer-implemented process, characterize the 3D scene as at least one set of connected planes, each set being subject to a series of geometric constraints, estimate plane normals and line directions for planes in the 3D scene which are to be modeled using the camera orientation matrix, recover a camera translation using the camera orientation matrix, wherein the camera translation is the difference between the camera projection center and the coordinate origin of the 3D scene, estimate unknown plane distances and vertex point locations, for each plane in the 3D scene which is to be modeled, by solving a system of linear geometric constraint equations created using the estimated plane normals and line directions, as well as user designated parameters comprising points, plane normals, line directions, plane distances and parallel planes, wherein the constraint equations have been characterized as being a hard constraint whenever the equation includes at least one of the user designated parameters and a soft constraint whenever the equation does not include a user designated parameter, and constructing a model of the 3D scene consisting of at least one set of connected planes based on the plane normal and plane distance, and/or the vertex point locations, of each plane in the set.

23. The system of claim 22, wherein the system of linear geometric constraint equations comprises:

| | |
|---|---|
| Known point | $x_i''$, |
| Known plane Distance | $d_i''$, |
| Parallel planes | $d_i - d_j = \text{Const.}$, |
| Point/model | $(x - t) \cdot p_j = 0$, |
| Point/plane | $x_i \cdot n_k'' + d_k = 0$, |
| Point/plane | $x_i \cdot n_k + d_k =$ , |
| Points/line | $(x_i - x_j) \times m'' = 0$, |
| Points/line | $(x_i - x_j) \times m = 0,0$ |
| Known length | $x_i - x_j = cm''$, |
| Known length | $x_i - x_j = cm$ | where x" represents the coordinates of a point in the 3D scene designated by the user and x represents the unknown coordinates of a point in the 3D scene, d" represents a distance from the origin of the 3D scene to a plane in the scene as designated by the user and d represents an unknown distance from the origin of the 3D scene to a plane in the scene, t represents the camera translation, $p_j$ represents $p_0=(-x_2, x_1, 0)$, $p_1=(-x_3, 0, x_1)$ and $p_2=(0, -x_3, x_2)$ which correspond to three directions perpendicular to a ray from the camera center through the point $x=(x_1, x_2, x3)$, n" represents a normal of a plane in the 3D scene designated by the user and n represents the estimated normal of a plane in the 3D scene, m" represents a direction of a line in the 3D scene designated by the user and m represents the estimated direction of a line in the 3D scene, and c represents a scaling factor.

24. The system of claim 22, wherein the camera translation has been previously estimated and the plane distances and vertex point locations estimating sub-module further comprises a sub-module for using the estimated camera translation to create the system of equations.

25. The system of claim 22, wherein the camera translation is unknown and estimated along with the unknown plane distances and vertex point locations from the system of linear geometric constraint equations.

26. The system of claim 22 further comprising a program module for decomposing the system of linear geometric constraint equations for each set of connected planes to ensure their respective solvability, said decomposing module being executed prior to executing the program module for estimating the unknown plane distances and vertex point locations for each set of connected planes in the 3D scene, and said decomposing module comprising a sub-module for imposing at least one requirement which when met is indicative of the solvability of a linear system of equations.

27. The system of claim 26, wherein the imposing sub-module comprises a sub-module for ensuring the number of equations in each system of equations is no fewer than the number of unknowns.

28. The system of claim 26, wherein the imposing sub-module comprises a sub-module for ensuring the right side of each equation in each system of equations is a non-zero vector.

29. The system of claim 26, wherein the imposing sub-module comprises a sub-module for ensuring all hard constraints are consistent with one another.

30. The system of claim 26, wherein the decomposing module further comprises a sub-module for declaring any system of equations unsolvable if the at least one solvability requirement is not met.

31. The system of claim 30, wherein the decomposing module further comprises a sub-module for providing an indication to the user of which unknown plane distances and/or vertex point locations cannot be estimated whenever a system of equations is declared unsolvable.

32. The system of claim 30, wherein the decomposing module further comprises a sub-module for indicating to the user what user designatable information could be entered to allow the system to be solved whenever a system of equations is declared unsolvable.

33. The system of claim 22, wherein the program module for estimating plane distances and vertex point locations comprises a sub-module for using an equality-constrained least squares approach wherein the equations of the system of equations characterized as soft constraints are solved subject to the equations of the system characterized as hard constraints.

34. The system of claim 22, wherein the program module for estimating plane distances and vertex point locations comprises sub-modules for:
   assigning a unity weight factor to all soft constraints and a large weight factor to all hard constraints; and
   estimating the unknown plane distances and vertex points for each set of connected planes in the 3D scene which is to be modeled from the weighted system of hard and soft constraint equations using the least-squares approach.

35. A system for constructing a model of a 3D scene from a single panoramic view of the scene, comprising:
   a general purpose computing device; and
   a computer program comprising program modules executable by the computing device, wherein the computing device is directed by the program modules of the computer program to,
   display an image of the single panoramic view of the 3D scene on a computer monitor screen,
   recover a camera orientation matrix of the single panoramic view based on lines associated with at least one plane of the 3D scene as specified by a user of the computer-implemented process,
   characterize the 3D scene as at least one set of connected planes, each set being subject to a series of geometric constraints,
   estimate plane normals and line directions for planes in the 3D scene which are to be modeled using the camera orientation matrix,
   recover a camera translation using the camera orientation matrix, wherein the camera translation is the difference between the camera projection center and the coordinate origin of the 3D scene,
   estimate unknown plane distances and vertex point locations, for each plane in the 3D scene which is to be modeled, by solving a system of linear geometric constraint equations created using the estimated plane normals and line directions, as well as user designated parameters comprising points, plane normals, line directions, plane distances and parallel planes,
   construct a model of the 3D scene consisting of at least one set of connected planes based on the plane normal and plane distance, and/or the vertex point locations, of each plane in the set.

36. The system of claim 35 further comprising a program module for decomposing the system of equations for each set of connected planes to ensure their respective solvability, said decomposing module being executed prior to performing the program module for estimating the unknown plane distances and vertex point locations for each set of connected planes in the 3D scene, and wherein said decomposing module comprises a sub-module for imposing at least one requirement which when met is indicative of the solvability of a linear system of equations.

37. The system of claim 36, wherein the imposing sub-module comprises a sub-module for ensuring the number of equations in each system of equations is no fewer than the number of unknowns.

38. The system of claim 36, wherein the imposing sub-module comprises a sub-module for ensuring the right side of each equation in each system of equations is a non-zero vector.

39. The system of claim 36, wherein the decomposing module further comprises a sub-module for declaring any system of equations unsolvable if the at least one solvability requirement is not met.

40. The system of claim 39, wherein the decomposing module further comprises a sub-module for providing an indication to the user of which unknown plane distances and/or vertex point locations cannot be estimated whenever a system of equations is declared unsolvable.

41. The system of claim 39, wherein the decomposing module further comprises a sub-module for indicating to the user what user designatable information could be entered to allow the system to be solved whenever a system of equations is declared unsolvable.

42. A computer-readable memory for constructing a model of a 3D scene from a single panoramic view of the scene, comprising:
   a computer-readable storage medium; and
   a computer program comprising program modules stored in the storage medium, wherein the storage medium is so configured by the computer program that it causes the computer to,
   display an image of the single panoramic view of the 3D scene an a computer monitor screen,
   recover a camera orientation matrix of the single panoramic view based on lines associated with at least one plane of the 3D scene as specified by a user of the computer-implemented process,
   characterize the 3D scene as at least one set of connected planes, each set being subject to a series of geometric constraints,
   estimate plane normals and line directions for planes in the 3D scene which are to be modeled using the camera orientation matrix,
   recover a camera translation using the camera orientation matrix, wherein the camera translation is the difference between the camera projection center and the coordinate origin of the 3D scene,
   estimate unknown plane distances and vertex point locations, for each plane in the 3D scene which is to be modeled, by solving a system of linear geometric constraint equations created using the estimated plane normals and line directions, as well as user designated parameters comprising points, plane normals, line directions, plane distances and parallel planes, wherein the constraint equations have been characterized as being a hard constraint whenever the equation includes at least one of the user designated parameters and a soft constraint whenever the equation does not include a user designated parameter, and constructing a model of the 3D scene consisting of at least one set of connected planes based on the plane normal and plane distance, and/or the vertex point locations, of each plane in the set.

43. The computer-readable memory of claim 42, wherein the system of linear geometric constraint equations comprises:

| | |
|---|---|
| Known point | $x_i''$, |
| Known plane | $d_i''$, |
| Distance | |
| Parallel planes | $d_i - d_j = \text{Const.}$, |
| Point/model | $(x - t) \cdot p_j = 0$, |
| Point/plane | $x_i \cdot n_k'' + d_k = 0$, |
| Point/plane | $x_i \cdot n_k + d_k = 0$, |
| Points/line | $(x_i - x_j) \times m'' = 0$, |
| Points/line | $(x_i - x_j) \times m = 0,0$ |
| Known length | $x_i - x_j = cm''$, | where $x''$ represents the coordinates of a point in the 3D scene designated by the user and x represents the unknown coordinates of a point in the 3D scene, $d''$ represents a distance from the origin of the 3D scene to a plane in the scene as designated by the user and d represents an unknown distance from the origin of the 3D scene to a plane in the scene, t represents the camera translation, $p_j$ represents $p_0=(-x_2, x_1, 0)$, $p_1=(-x_3, 0, x_1)$ and $p_2=(0, -x_3, x_2)$ which correspond to three directions perpendicular to a ray from the camera center through the point $x=(x_1, x_2, x_3)$, $n''$ represents a normal of a plane in the 3D scene designated by the user and n represents the estimated normal of a plane in the 3D scene, $m''$ represents a direction of a line in the 3D scene designated by the user and m represents the estimated direction of a line in the 3D scene, and c represents a scaling factor.

44. The computer-readable memory of claim 42, wherein the camera translation has been previously estimated and the plane distances and vertex point locations estimating sub-module further comprises a sub-module for using the estimated camera translation to create the system of equations.

45. The computer-readable memory of claim 42, wherein the camera translation is unknown and estimated along with the unknown plane distances and vertex point locations from the system of linear geometric constraint equations.

46. The computer-readable memory of claim 42 further comprising a program module for decomposing the system of linear geometric constraint equations for each set of connected planes to ensure their respective solvability, said decomposing module being executed prior to executing the program module for estimating the unknown plane distances and vertex point locations for each set of connected planes in the 3D scene, and said decomposing module comprising a sub-module for imposing at least one requirement which when met is indicative of the solvability of a linear system of equations.

47. The computer-readable memory of claim 46, wherein the imposing sub-module comprises a sub-module for ensuring the number of equations in each system of equations is no fewer than the number of unknowns.

48. The computer-readable memory of claim 46, wherein the imposing sub-module comprises a sub-module for ensuring the right side of each equation in each system of equations is a non-zero vector.

49. The computer-readable memory of claim 46, wherein the imposing sub-module comprises a sub-module for ensuring all hard constraints are consistent with one another.

50. The computer-readable memory of claim 46, wherein the decomposing module further comprises a sub-module for declaring any system of equations unsolvable if the at least one solvability requirement is not met.

51. The computer-readable memory of claim 50, wherein the decomposing module further comprises a sub-module for providing an indication to the user of which unknown plane distances and/or vertex point locations cannot be estimated whenever a system of equations is declared unsolvable.

52. The computer-readable memory of claim 50, wherein the decomposing module further comprises a sub-module for indicating to the user what user designatable information could be entered to allow the system to be solved whenever a system of equations is declared unsolvable.

53. The computer-readable memory of claim 42, wherein the program module for estimating plane distances and vertex point locations comprises a sub-module for using an equality-constrained least squares approach wherein the equations of the system of equations characterized as soft constraints are solved subject to the equations of the system characterized as hard constraints.

54. The computer-readable memory of claim 42, wherein the program module for estimating plane distances and vertex point locations comprises sub-modules for:

assigning a unity weight factor to all soft constraints and a large weight factor to all hard constraints; and estimating the unknown plane distances and vertex points for each set of connected planes in the 3D scene which is to be modeled from the weighted system of hard and soft constraint equations using the least-squares approach.

55. A computer-readable memory for constructing a model of a 3D scene from a single panoramic view of the scene, comprising:

a computer-readable storage medium; and a computer program comprising program modules stored in the storage medium, wherein the storage medium is so configured by the computer program that it causes the computer to, display an image of the single panoramic view of the 3D scene on a computer monitor screen, recover a camera orientation matrix of the single panoramic view based on lines associated with at least one plane of the 3D scene as specified by a user of the computer implemented process, characterize the 3D scene as at least one set of connected planes, each set being subject to a series of geometric constraints, estimate plane normals and line directions for planes in the 3D scene which are to be modeled using the camera orientation matrix, recover a camera translation using the camera orientation matrix, wherein the camera translation is the difference between the camera projection center and the coordinate origin of the 3D scene, estimate unknown plane distances and vertex point locations, for each plane in the 3D scene which is to be modeled, by solving a system of linear geometric constraint equations created using the estimated plane normals and line directions, as well as user designated parameters comprising points, plane normals, line directions, plane distances and parallel planes, construct a model of the 3D scene consisting of at least one set of connected planes based on the plane normal and plane distance, and/or the vertex point locations, of each plane in the set et.

56. The computer-readable memory of claim 55 further comprising a program module for decomposing the system of equations for each set of connected planes to ensure their respective solvability, said decomposing module being executed prior to performing the program module for estimating the unknown plane distances and vertex point locations for each set of connected planes in the 3D scene, and wherein said decomposing module comprises a sub-module for imposing at least one requirement which when met is indicative of the solvability of a linear system of equations.

57. The computer-readable memory of claim 56, wherein the imposing sub-module comprises a sub-module for ensuring the number of equations in each system of equations is no fewer than the number of unknowns.

58. The computer-readable memory of claim 56, wherein the imposing sub-module comprises a sub-module for ensuring the right side of each equation in each system of equations is a non-zero vector.

59. The computer-readable memory of claim 56, wherein the decomposing module further comprises a sub-module for declaring any system of equations unsolvable if the at least one solvability requirement is not met.

60. The computer-readable memory of claim 59, wherein the decomposing module further comprises a sub-module for providing an indication to the user of which unknown plane distances and/or vertex point locations cannot be estimated whenever a system of equations is declared unsolvable.

61. The computer-readable memory of claim 59, wherein the decomposing module further comprises a sub-module for indicating to the user what user designatable information could be entered to allow the system to be solved whenever a system of equations is declared unsolvable.

62. A system for constructing a model of a 3D scene from a single panoramic view of the scene, comprising:

a general purpose computing device;

an interface for dynamically interfacing a user to the computing device, wherein the user is provided with a display of an image of the single panoramic view of the 3D scene on a computer monitor screen, the user then specifying features on the screen image;

a computer program comprising program modules executable by the computing device, wherein the computing device is directed by the program modules of the computer program to, recover a camera orientation matrix of the single panoramic view based on lines associated with at least one plane of the 3D scene as specified by a user of the computer-implemented process, characterize the 3D scene as at least one set of connected planes, each set being subject to a series of geometric constraints, estimate plane normals and line directions for planes in the 3D scene which are to be modeled using the camera orientation matrix, recover a camera translation using the camera orientation matrix, wherein the camera translation is the difference between the camera projection center and the coordinate origin of the 3D scene, estimate unknown plane distances and vertex point locations, for each plane in the 3D scene which is to be modeled, by solving a system of linear geometric constraint equations created using the estimated plane normals and line directions, as well as user designated parameters comprising points, plane normals, line directions, plane distances and parallel planes, wherein the constraint equations have been characterized as being a hard constraint whenever the equation includes at least one of the user designated parameters and a soft constraint whenever the equation does not include a user designated parameter, and constructing a model of the 3D scene consisting of at least one set of connected planes based on the plane normal and plane distance, and/or the vertex point locations, of each plane in the set.

63. The system of claim 62, wherein the system of linear geometric constraint equations comprises:

| | |
|---|---|
| Known point | $x_i''$, |
| Known plane Distance | $d_i''$, |
| Parallel planes | $d_i - d_j = \text{Const.}$, |
| Point/model | $(x - t) \cdot p_j = 0$, |
| Point/plane | $x_i \cdot n_k'' + d_k = 0$, |
| Point/plane | $x_i \cdot n_k + d_k = 0$, |
| Points/line | $(x_i - x_j) \times m'' = 0$, |
| Points/line | $(x_i - x_j) \times m = 0,0$ |
| Known length | $x_i - x_j = cm''$, |
| Known length | $x_i - x_j = cm$ | where x" represents the coordinates of a point in the 3D scene designated by the user and x represents the unknown coordinates of a point in the 3D scene, d" represents a distance from the origin of the 3D scene to a plane in the scene as designated by the user and d represents an unknown distance from the origin of the 3D scene to a plane in the scene, t represents the camera translation, $p_j$ represents $p_0=(-x_2, x_1, 0)$, $p_1=(-x_3, 0, x_1)$ and $p_2=(0, -x_3, x_2)$ which correspond to three directions perpendicular to a ray from the camera center through the point $x=(x_1, x_2, x_3)$, n" represents a normal of a plane in the 3D scene designated by the user and n represents the estimated normal of a plane in the 3D scene, m" represents a direction of a line in the 3D scene designated by the user and m represents the estimated direction of a line in the 3D scene, and c represents a scaling factor.

64. The system of claim 62, wherein the camera translation has been previously estimated and the plane distances and vertex point locations estimating sub-module further comprises a sub-module for using the estimated camera translation to create the system of equations.

65. The system of claim 62, wherein the camera translation is unknown and estimated along with the unknown plane distances and vertex point locations from the system of linear geometric constraint equations.

66. The system of claim 62 further comprising a program module for decomposing the system of linear geometric constraint equations for each set of connected planes to ensure their respective solvability, said decomposing module being executed prior to executing the program module for estimating the unknown plane distances and vertex point locations for each set of connected planes in the 3D scene, and said decomposing module comprising a sub-module for imposing at least one requirement which when met is indicative of the solvability of a linear system of equations.

67. The system of claim 66, wherein the imposing sub-module comprises a sub-module for ensuring the number of equations in each system of equations is no fewer than the number of unknowns.

68. The system of claim 66, wherein the imposing sub-module comprises a sub-module for ensuring the right side of each equation in each system of equations is a non-zero vector.

69. The system of claim 66, wherein the imposing sub-module comprises a sub-module for ensuring all hard constraints are consistent with one another.

70. The system of claim 66, wherein the decomposing module further comprises a sub-module for declaring any system of equations unsolvable if the at least one solvability requirement is not met.

71. The system of claim 70, wherein the interface further comprises a prompting image to provide the user with an indication of which unknown plane distances and/or vertex point locations cannot be estimated whenever a system of equations is declared unsolvable, and wherein the decomposing module further comprises a sub-module for providing an indication to the user via the interface of which unknown plane distances and/or vertex point locations cannot be estimated whenever a system of equations is declared unsolvable.

72. The system of claim 70, wherein the interface further comprises a prompting image to provide the user with an indication of what user designatable information could be entered to allow the system to be solved whenever a system of equations is declared unsolvable, and wherein the decomposing module further comprises a sub-module for indicating to the user via the interface said user designatable information.

73. The system of claim 62, wherein the program module for estimating plane distances and vertex point locations comprises a sub-module for using an equality-constrained least squares approach wherein the equations of the system of equations characterized as soft constraints are solved subject to the equations of the system characterized as hard constraints.

74. The system of claim 62, wherein the program module for estimating plane distances and vertex point locations comprises sub-modules for:

assigning a unity weight factor to all soft constraints and a large weight factor to all hard constraints; and estimating the unknown plane distances and vertex points for each set of connected planes in the 3D scene which is to be modeled from the weighted system of hard and soft constraint equations using the least-squares approach.

75. A system for constructing a model of a 3D scene from a single panoramic view of the scene, comprising:

a general purpose computing device; an interface for dynamically interfacing a user to the computing device, wherein the user is provided with a display of an image of the single panoramic view of the 3D scene on a computer monitor screen, the user then specifying features on the screen image;

a computer program comprising program modules executable by the computing device, wherein the computing device is directed by the program modules of the computer program to, recover a camera orientation matrix of the single panoramic view based on lines associated with at least one plane of the 3D scene as specified by a user of the computer-implemented process, characterize the 3D scene as at least one set of connected planes, each set being subject to a series of geometric constraints, estimate plane normals and line directions for planes in the 3D scene which are to be modeled using the camera orientation matrix, recover a camera translation using the camera orientation matrix, wherein the camera translation is the difference between the camera projection center and the coordinate origin of the 3D scene, estimate unknown plane distances and vertex point locations, for each plane in the 3D scene which is to be modeled, by solving a system of linear geometric constraint equations created using the estimated plane normals and line directions, as well as user designated parameters comprising points, plane normals, line directions, plane distances and parallel planes, construct a model of the 3D scene consisting of at least one set of connected planes based on the plane normal and plane distance, and/or the vertex point locations, of each plane in the set.

76. The system of claim 75 further comprising a program module for decomposing the system of equations for each set of connected planes to ensure their respective solvability, said decomposing module being executed prior to performing the program module for estimating the unknown plane distances and vertex point locations for each set of connected planes in the 3D scene, and wherein said decomposing module comprises a sub-module for imposing at least one requirement which when met is indicative of the solvability of a linear system of equations.

77. The system of claim 76, wherein the imposing sub-module comprises a sub-module for ensuring the number of equations in each system of equations is no fewer than the number of unknowns.

78. The system of claim 76, wherein the imposing sub-module comprises a sub-module for ensuring the right side of each equation in each system of equations is a non-zero vector.

79. The system of claim 76, wherein the decomposing module further comprises a sub-module for declaring any system of equations unsolvable if the at least one solvability requirement is not met.

80. The system of claim 79, wherein the interface further comprises a prompting image to provide the user with an indication of which unknown plane distances and/or vertex point locations cannot be estimated whenever a system of equations is declared unsolvable, and wherein the decomposing module further comprises a sub-module for providing an indication to the user via the interface of which unknown plane distances and/or vertex point locations cannot be estimated whenever a system of equations is declared unsolvable.

81. The system of claim 79, wherein the interface further comprises a prompting image to provide the user with an indication of what user designatable information could be entered to allow the system to be solved whenever a system of equations is declared unsolvable, and wherein the decomposing module further comprises a sub-module for indicating to the user via the interface said user designatable information.

82. A computer-implemented process to construct a model of a 3D scene from a single panoramic image of the scene, comprising using a computer to perform the following process action:

displaying the single panoramic image of the scene to a user;

recovering a camera orientation matrix of the single panoramic image based on lines associated with at least one plane of the 3D scene as specified by a user of the computer-implemented process using the displayed image;

characterizing the 3D scene as at least one set of connected planes, each set being subject to a series of geometric constraints;

estimating plane normals and line directions for planes in the 3D scene which are to be modeled using the camera orientation matrix, recovering a camera translation using the camera orientation matrix, wherein the camera translation is the difference between the camera projection center and the coordinate origin of the 3D scene;

estimating unknown plane distances and vertex point locations, for each plane in the 3D scene which is to be modeled, by solving a system of linear geometric constraint equations created using the estimated plane normals and line directions, as well as user designated parameters, wherein said parameters comprise at least one point plane normal, line direction, plane distance or pair of parallel planes specified by the user using said displayed image of the scene;

constructing a model of the 3D scene consisting of at least one set of connected planes based on the plane normal and plane distance, and/or the vertex point locations, of each plane in the set.

* * * * *

UNITED STATES PATENT AND TRADEMARK OFFICE
CERTIFICATE OF CORRECTION

PATENT NO. : 6,271,855 B1
DATED : August 7, 2001
INVENTOR(S) : Shum et al.

It is certified that error appears in the above-identified patent and that said Letters Patent is hereby corrected as shown below:

Column 15,
Line 59, equation (13) should appear as follows:
$$Cw = CQQ^Tw = R^Tw_1 = q$$

Claim 1,
Line 25, delete "T" and substitute -- , --; and

Claim 82,
Line 28, insert -- , -- after "point"

Signed and Sealed this

Twenty-sixth Day of February, 2002

*Attest:*

JAMES E. ROGAN
*Attesting Officer*     *Director of the United States Patent and Trademark Office*